(12) United States Patent
Leen et al.

(10) Patent No.: US 10,094,585 B2
(45) Date of Patent: Oct. 9, 2018

(54) AUTO TEST FOR DELTA T DIAGNOSTICS IN AN HVAC SYSTEM

(71) Applicant: Honeywell International Inc., Morristown, NJ (US)

(72) Inventors: Cary Leen, Hammond, WI (US); Stan Zywicki, Eden Prairie, MN (US); Eric Barton, Eden Prairie, MN (US)

(73) Assignee: Honeywell International Inc., Morris Plains, NJ (US)

( * ) Notice: Subject to any disclaimer, the term of this patent is extended or adjusted under 35 U.S.C. 154(b) by 1148 days.

(21) Appl. No.: 13/750,737

(22) Filed: Jan. 25, 2013

(65) Prior Publication Data
US 2014/0214212 A1 Jul. 31, 2014

(51) Int. Cl.
*F24F 11/46* (2018.01)
*F24F 11/49* (2018.01)
(Continued)

(52) U.S. Cl.
CPC .......... *F24F 11/0086* (2013.01); *F24F 11/30* (2018.01); *G05B 15/02* (2013.01); *G05D 23/1902* (2013.01); *F24F 11/46* (2018.01); *F24F 11/49* (2018.01); *F24F 11/52* (2018.01); *F24F 11/63* (2018.01); *F24F 2110/10* (2018.01); *F24F 2221/50* (2013.01)

(58) Field of Classification Search
None
See application file for complete search history.

(56) References Cited

U.S. PATENT DOCUMENTS

| 4,016,360 A | 4/1977 | Cane |
| 4,079,366 A | 3/1978 | Wong |

(Continued)

FOREIGN PATENT DOCUMENTS

| DE | 3334117 | 4/1985 |
| EP | 0070414 | 1/1983 |

(Continued)

OTHER PUBLICATIONS

Honeywell System Installation Guide; pulled from: https://customer.honeywell.com/resources/techlit/TechLitDocuments/69-0000s/69-2490.pdf; hereinafter referred as NPL_THX9321; p. 1-28, Year 2012).*

(Continued)

*Primary Examiner* — Ronald D Hartman, Jr.
(74) *Attorney, Agent, or Firm* — Seager Tufte & Wickhem LLP

(57) ABSTRACT

An HVAC controller may be programmed to initiate a delta T test in response to a request received from a user. The user may initiate the delta T test at the HVAC controller or via a remote device. In some cases, the HVAC controller may be configured to automatically execute a delta T test for each valid equipment stage combination of the HVAC system without receiving further input from the user and to determine both a run time and a stabilized delta T parameter value for each equipment stage combination. The HVAC controller may also record the delta T parameter value and run time for each test in the memory of the HVAC controller. The HVAC controller may be further configured to notify the user when testing for each/all equipment stage combination is complete.

20 Claims, 11 Drawing Sheets

(51) Int. Cl.
  *F24F 11/63* (2018.01)
  *G05B 15/02* (2006.01)
  *F24F 11/00* (2018.01)
  *F24F 11/30* (2018.01)
  *G05D 23/19* (2006.01)
  *F24F 110/10* (2018.01)
  *F24F 11/52* (2018.01)

(56) References Cited

U.S. PATENT DOCUMENTS

| | | |
|---|---|---|
| 4,174,807 A | 11/1979 | Smith et al. |
| 4,206,872 A | 6/1980 | Levine |
| 4,224,615 A | 9/1980 | Penz |
| 4,264,034 A | 4/1981 | Hyltin et al. |
| 4,296,334 A | 10/1981 | Wong |
| 4,298,946 A | 11/1981 | Hartsell et al. |
| 4,308,991 A | 1/1982 | Peinetti et al. |
| 4,332,352 A | 6/1982 | Jaeger |
| 4,337,822 A | 7/1982 | Hyltin et al. |
| 4,337,893 A | 7/1982 | Flanders et al. |
| 4,373,664 A | 2/1983 | Barker et al. |
| 4,379,483 A | 4/1983 | Farley |
| 4,382,544 A | 5/1983 | Stewart |
| 4,386,649 A | 6/1983 | Hines et al. |
| 4,388,692 A | 6/1983 | Jones et al. |
| 4,431,134 A | 2/1984 | Hendricks et al. |
| 4,442,972 A | 4/1984 | Sahay et al. |
| 4,446,913 A | 5/1984 | Krocker |
| 4,479,604 A | 10/1984 | Didner |
| 4,503,471 A | 3/1985 | Hanajima et al. |
| 4,506,827 A | 3/1985 | Jamieson et al. |
| 4,556,169 A | 12/1985 | Zervos |
| 4,585,164 A | 4/1986 | Butkovich et al. |
| 4,606,401 A | 8/1986 | Levine et al. |
| 4,621,336 A | 11/1986 | Brown |
| 4,622,544 A | 11/1986 | Bially et al. |
| 4,628,201 A | 12/1986 | Schmitt |
| 4,646,964 A | 3/1987 | Parker et al. |
| 4,717,333 A | 1/1988 | Carignan |
| 4,725,001 A | 2/1988 | Carney et al. |
| 4,819,714 A | 4/1989 | Otsuka et al. |
| 4,837,731 A | 6/1989 | Levine et al. |
| 4,881,686 A | 11/1989 | Mehta |
| 4,918,439 A | 4/1990 | Wozniak et al. |
| 4,920,263 A | 4/1990 | Fimian et al. |
| 4,942,613 A | 7/1990 | Lynch |
| 4,948,040 A | 8/1990 | Kobayashi et al. |
| 4,969,508 A | 11/1990 | Tate et al. |
| 4,992,779 A | 2/1991 | Sugino et al. |
| 4,997,029 A | 3/1991 | Otsuka et al. |
| 5,005,365 A | 4/1991 | Lynch |
| 5,012,973 A | 5/1991 | Dick et al. |
| 5,036,698 A | 8/1991 | Conti |
| 5,038,851 A | 8/1991 | Metha |
| 5,042,265 A | 8/1991 | Baldwin et al. |
| 5,053,752 A | 10/1991 | Epstein et al. |
| 5,065,813 A | 11/1991 | Berkeley et al. |
| 5,086,385 A | 2/1992 | Launey et al. |
| 5,088,645 A | 2/1992 | Bell |
| 5,140,310 A | 8/1992 | DeLuca et al. |
| 5,161,606 A | 11/1992 | Berkeley et al. |
| 5,170,935 A | 12/1992 | Federspiel et al. |
| 5,172,565 A | 12/1992 | Wruck et al. |
| 5,181,653 A | 1/1993 | Foster et al. |
| 5,187,797 A | 2/1993 | Nielsen et al. |
| 5,191,874 A | 3/1993 | McWilliams |
| 5,197,862 A | 3/1993 | Kladder |
| 5,230,482 A | 7/1993 | Ratz et al. |
| 5,238,184 A | 8/1993 | Adams |
| 5,251,813 A | 10/1993 | Kniepkamp |
| 5,259,445 A | 11/1993 | Pratt et al. |
| 5,272,477 A | 12/1993 | Tashima et al. |
| 5,284,024 A * | 2/1994 | Hanson ............... B60H 1/3225 62/126 |
| 5,329,991 A | 7/1994 | Metha et al. |
| 5,348,078 A | 9/1994 | Dushane et al. |
| 5,351,035 A | 9/1994 | Chrisco |
| 5,386,577 A | 1/1995 | Zenda |
| 5,388,444 A | 2/1995 | Gerard |
| 5,390,206 A | 2/1995 | Rein et al. |
| 5,395,042 A | 3/1995 | Riley et al. |
| 5,404,934 A | 4/1995 | Carlson et al. |
| 5,414,618 A | 5/1995 | Mock et al. |
| 5,429,649 A | 7/1995 | Robin |
| 5,482,209 A | 1/1996 | Cochran et al. |
| 5,495,722 A | 3/1996 | Manson et al. |
| 5,495,887 A | 3/1996 | Kathnelson et al. |
| 5,506,572 A | 4/1996 | Hills et al. |
| 5,526,422 A | 6/1996 | Keen |
| 5,537,106 A | 7/1996 | Mitcuhashi |
| 5,544,036 A | 8/1996 | Brown, Jr. et al. |
| 5,551,797 A | 9/1996 | Sanford |
| 5,566,879 A | 10/1996 | Longtin |
| 5,568,385 A | 10/1996 | Shelton |
| 5,570,837 A | 11/1996 | Brown et al. |
| 5,590,831 A | 1/1997 | Manson et al. |
| 5,603,451 A | 2/1997 | Helander et al. |
| 5,654,813 A | 8/1997 | Whitworth |
| 5,668,535 A | 9/1997 | Hendrix et al. |
| 5,671,083 A | 9/1997 | Conner et al. |
| 5,673,850 A | 10/1997 | Uptegraph |
| 5,679,137 A | 10/1997 | Erdman et al. |
| 5,682,206 A | 10/1997 | Wehmeyer et al. |
| 5,711,785 A | 1/1998 | Maxwell |
| 5,729,474 A | 3/1998 | Hildebrand et al. |
| 5,732,691 A | 3/1998 | Maiello et al. |
| 5,761,083 A | 6/1998 | Brown, Jr. et al. |
| 5,761,649 A | 6/1998 | Hill |
| 5,782,296 A | 7/1998 | Metha |
| 5,810,908 A | 9/1998 | Gray et al. |
| 5,818,428 A | 10/1998 | Eisenbrandt et al. |
| 5,833,134 A | 11/1998 | Ho et al. |
| 5,836,815 A | 11/1998 | Jennemann |
| 5,839,654 A | 11/1998 | Weber |
| 5,840,094 A | 11/1998 | Osendorf et al. |
| 5,841,112 A | 11/1998 | Brooks et al. |
| 5,862,737 A | 1/1999 | Chin et al. |
| 5,873,519 A | 2/1999 | Beilfuss |
| 5,877,957 A | 3/1999 | Bennett |
| 5,886,697 A | 3/1999 | Naughton et al. |
| 5,901,183 A | 5/1999 | D' Souza |
| 5,902,183 A | 5/1999 | D' Souza |
| 5,909,429 A | 6/1999 | Satyanarayana et al. |
| 5,915,473 A | 6/1999 | Ganesh et al. |
| 5,917,141 A | 6/1999 | Naquin, Jr. |
| D413,328 S | 8/1999 | Kazama |
| 5,937,942 A | 8/1999 | Bias et al. |
| 5,947,372 A | 9/1999 | Tiernan |
| 5,950,709 A | 9/1999 | Krueger et al. |
| 5,997,476 A | 12/1999 | Brown |
| 6,009,355 A | 12/1999 | Obradovich et al. |
| 6,013,121 A | 1/2000 | Chin et al. |
| 6,020,881 A | 2/2000 | Naughton et al. |
| 6,032,867 A | 3/2000 | Dushane et al. |
| D422,594 S | 4/2000 | Henderson et al. |
| 6,059,195 A | 5/2000 | Adams et al. |
| 6,064,310 A | 5/2000 | Busak et al. |
| 6,081,197 A | 6/2000 | Garrick et al. |
| 6,084,523 A | 7/2000 | Gelnovatch et al. |
| 6,088,688 A | 7/2000 | Crooks et al. |
| 6,101,824 A | 8/2000 | Meyer et al. |
| 6,104,963 A | 8/2000 | Cebasek et al. |
| 6,119,125 A | 9/2000 | Gloudeman et al. |
| 6,121,875 A | 9/2000 | Hamm et al. |
| 6,140,987 A | 10/2000 | Stein et al. |
| 6,141,595 A | 10/2000 | Gloudeman et al. |
| 6,145,751 A | 11/2000 | Ahmed et al. |
| 6,149,065 A | 11/2000 | White et al. |
| 6,152,375 A | 11/2000 | Robison |
| 6,154,681 A | 11/2000 | Drees et al. |
| 6,167,316 A | 12/2000 | Gloudeman et al. |
| 6,167,766 B1 | 1/2001 | Dunn et al. |
| 6,175,934 B1 | 1/2001 | Hershey et al. |

(56) References Cited

U.S. PATENT DOCUMENTS

| | | |
|---|---|---|
| 6,190,442 B1 | 2/2001 | Redner |
| 6,192,282 B1 | 2/2001 | Smith et al. |
| 6,196,467 B1 | 3/2001 | Dushane et al. |
| 6,208,331 B1 | 3/2001 | Singh et al. |
| 6,216,956 B1 | 4/2001 | Ehlers et al. |
| 6,236,326 B1 | 5/2001 | Murphy |
| 6,259,074 B1 | 7/2001 | Brunner et al. |
| 6,260,765 B1 | 7/2001 | Natale et al. |
| 6,282,454 B1 | 8/2001 | Papadopoulos et al. |
| 6,285,912 B1 | 9/2001 | Ellison et al. |
| 6,290,140 B1 | 9/2001 | Pesko et al. |
| D448,757 S | 10/2001 | Okubo |
| 6,315,211 B1 | 11/2001 | Sartain et al. |
| 6,318,639 B1 | 11/2001 | Toth |
| 6,321,637 B1 | 11/2001 | Shanks et al. |
| 6,330,806 B1 | 12/2001 | Beaverson et al. |
| 6,351,693 B1 | 2/2002 | Monie et al. |
| 6,344,861 B1 | 3/2002 | Naughton et al. |
| 6,385,510 B1 | 5/2002 | Hoog et al. |
| 6,394,359 B1 | 5/2002 | Morgan |
| 6,398,118 B1 | 6/2002 | Rosen et al. |
| 6,448,896 B1 | 9/2002 | Bankus et al. |
| 6,449,726 B1 | 9/2002 | Smith |
| 6,453,687 B2 | 9/2002 | Sharood et al. |
| D464,948 S | 10/2002 | Vasquez et al. |
| 6,460,774 B2 | 10/2002 | Sumida et al. |
| 6,466,132 B1 | 10/2002 | Caronna et al. |
| 6,467,054 B1 | 10/2002 | Lenny |
| 6,478,233 B1 | 11/2002 | Shah |
| 6,493,425 B1 | 12/2002 | Abe |
| 6,496,858 B1 | 12/2002 | Frailong et al. |
| 6,502,758 B2 | 1/2003 | Cottrell |
| 6,507,282 B1 | 1/2003 | Sherwood |
| 6,518,953 B1 | 2/2003 | Armstrong |
| 6,518,957 B1 | 2/2003 | Lehtinen et al. |
| 6,535,838 B2 | 3/2003 | Abraham et al. |
| 6,539,499 B1 | 3/2003 | Stedman et al. |
| 6,546,419 B1 | 4/2003 | Humpleman et al. |
| 6,556,899 B1 | 4/2003 | Harvey et al. |
| 6,574,537 B2 | 6/2003 | Kipersztok et al. |
| 6,578,770 B1 | 6/2003 | Rosen |
| 6,580,950 B1 | 6/2003 | Johnson et al. |
| 6,581,846 B1 | 6/2003 | Rosen |
| 6,584,113 B1 | 6/2003 | Manduley et al. |
| 6,584,430 B1 | 6/2003 | Rosenbaum et al. |
| 6,595,430 B1 | 7/2003 | Shah |
| 6,596,059 B1 | 7/2003 | Greist et al. |
| 6,601,086 B1 | 7/2003 | Howard et al. |
| D478,051 S | 8/2003 | Sagawa |
| 6,608,560 B2 | 8/2003 | Abrams |
| 6,619,555 B2 | 9/2003 | Rosen |
| 6,621,507 B1 | 9/2003 | Shah |
| 6,643,611 B1 | 11/2003 | Ito et al. |
| 6,658,372 B2 | 12/2003 | Abraham et al. |
| 6,658,586 B1 | 12/2003 | Levi |
| 6,663,010 B2 | 12/2003 | Chene et al. |
| 6,685,098 B2 | 2/2004 | Okano et al. |
| 6,697,894 B1 | 2/2004 | Mitchell et al. |
| 6,708,072 B2 | 3/2004 | Arima et al. |
| 6,711,470 B1 | 3/2004 | Hartenstein et al. |
| 6,726,112 B1 | 4/2004 | Ho |
| 6,741,915 B2 | 5/2004 | Poth |
| D492,282 S | 6/2004 | Lachello et al. |
| 6,754,707 B2 | 6/2004 | Richards et al. |
| 6,778,945 B2 | 8/2004 | Chassin et al. |
| 6,782,345 B1 | 8/2004 | Siegel et al. |
| 6,783,079 B2 | 8/2004 | Carey et al. |
| 6,786,421 B2 | 9/2004 | Rosen |
| 6,789,739 B2 | 9/2004 | Rosen |
| 6,792,321 B2 | 9/2004 | Sepe, Jr. |
| 6,801,849 B2 | 10/2004 | Szukala et al. |
| 6,810,307 B1 | 10/2004 | Addy |
| 6,810,397 B1 | 10/2004 | Qian et al. |
| 6,824,069 B2 | 11/2004 | Rosen |
| 6,826,512 B2 | 11/2004 | Dara-Abrams et al. |
| 6,832,199 B1 | 12/2004 | Kucek et al. |
| 6,833,990 B2 | 12/2004 | LaCroix et al. |
| 6,836,737 B2 | 12/2004 | Petite et al. |
| 6,842,721 B2 | 1/2005 | Kim et al. |
| 6,847,916 B1 | 1/2005 | Ying |
| 6,851,621 B1 | 2/2005 | Wacker et al. |
| 6,853,958 B1 | 2/2005 | Turin et al. |
| 6,854,010 B1 | 2/2005 | Christian et al. |
| 6,857,013 B2 | 2/2005 | Ramberg et al. |
| 6,868,293 B1 | 3/2005 | Schurr et al. |
| 6,891,838 B1 | 5/2005 | Petite et al. |
| 6,892,225 B1 | 5/2005 | Tu et al. |
| 6,947,675 B2 | 9/2005 | Koyama et al. |
| 6,967,565 B2 | 11/2005 | Lingemann |
| D512,208 S | 12/2005 | Kubo et al. |
| 6,973,410 B2 | 12/2005 | Seigel |
| 7,001,495 B2 | 2/2006 | Essalik et al. |
| 7,002,462 B2 | 2/2006 | Welch |
| 7,035,768 B2 | 4/2006 | Matsuda |
| D520,989 S | 5/2006 | Miller |
| 7,047,092 B2 | 5/2006 | Wimsatt |
| 7,050,026 B1 | 5/2006 | Rosen |
| 7,055,759 B2 | 6/2006 | Wacker et al. |
| 7,058,508 B2 | 6/2006 | Combs et al. |
| 7,080,358 B2 | 7/2006 | Kuzmin |
| 7,083,109 B2 | 8/2006 | Pouchak |
| 7,083,189 B2 | 8/2006 | Ogata |
| 7,089,088 B2 | 8/2006 | Terry et al. |
| 7,092,794 B1 | 8/2006 | Hill et al. |
| 7,108,194 B1 | 9/2006 | Hankins, II |
| 7,130,719 B2 | 10/2006 | Ehlers et al. |
| 7,130,720 B2 | 10/2006 | Fisher |
| D531,588 S | 11/2006 | Peh |
| 7,135,965 B2 | 11/2006 | Chapman, Jr. et al. |
| D533,515 S | 12/2006 | Klein et al. |
| 7,144,611 B2 | 12/2006 | Nakamura et al. |
| 7,146,253 B2 | 12/2006 | Hoog et al. |
| 7,152,806 B1 | 12/2006 | Rosen |
| 7,156,318 B1 | 1/2007 | Rosen |
| 7,163,156 B2 | 1/2007 | Kates |
| 7,188,002 B2 | 3/2007 | Chapman, Jr. et al. |
| D542,236 S | 5/2007 | Klein et al. |
| 7,212,887 B2 | 5/2007 | Shah et al. |
| 7,222,800 B2 | 5/2007 | Wruck |
| 7,225,054 B2 | 5/2007 | Amundson et al. |
| 7,231,605 B1 | 6/2007 | Ramakesavan |
| 7,232,075 B1 | 6/2007 | Rosen |
| 7,240,289 B2 | 7/2007 | Naughton et al. |
| 7,261,762 B2 | 8/2007 | Kang et al. |
| 7,274,973 B2 | 9/2007 | Nichols et al. |
| 7,302,642 B2 | 11/2007 | Smith et al. |
| 7,331,187 B2 | 2/2008 | Kates |
| 7,341,201 B2 | 3/2008 | Stanimirovic |
| 7,354,005 B2 | 4/2008 | Carey et al. |
| 7,383,158 B2 | 6/2008 | Krocker et al. |
| RE40,437 E | 7/2008 | Rosen |
| 7,419,532 B2 | 9/2008 | Sellers et al. |
| 7,435,278 B2 | 10/2008 | Terlson |
| 7,451,606 B2 | 11/2008 | Harrod |
| 7,452,396 B2 | 11/2008 | Terlson et al. |
| 7,496,627 B2 | 2/2009 | Moorer et al. |
| 7,505,914 B2 | 3/2009 | McCall |
| 7,542,867 B2 | 6/2009 | Steger et al. |
| 7,556,207 B2 | 7/2009 | Mueller et al. |
| 7,594,960 B2 | 9/2009 | Johansson |
| 7,604,046 B2 | 10/2009 | Bergman et al. |
| 7,617,691 B2 | 11/2009 | Street et al. |
| 7,644,591 B2 | 1/2010 | Singh et al. |
| 7,665,019 B2 | 2/2010 | Jaeger |
| 7,676,282 B2 | 3/2010 | Bosley |
| 7,707,189 B2 | 4/2010 | Haselden et al. |
| 7,713,339 B2 | 5/2010 | Johansson |
| 7,734,724 B2 | 6/2010 | Rezvani et al. |
| 7,739,282 B1 | 6/2010 | Smith et al. |
| 7,770,242 B2 | 8/2010 | Sell |
| 7,784,291 B2 | 8/2010 | Butler et al. |
| 7,793,056 B2 | 9/2010 | Boggs et al. |
| 7,801,646 B2 | 9/2010 | Amundson et al. |
| 7,814,516 B2 | 10/2010 | Stecyk et al. |

(56) References Cited

U.S. PATENT DOCUMENTS

| | | |
|---|---|---|
| 7,865,252 B2 | 1/2011 | Clayton |
| 7,941,431 B2 | 5/2011 | Bluhm et al. |
| 7,957,775 B2 | 6/2011 | Allen, Jr. et al. |
| 7,984,220 B2 | 7/2011 | Gerard et al. |
| 8,032,254 B2 | 10/2011 | Amundson et al. |
| 8,040,234 B2 | 10/2011 | Ebrom et al. |
| 8,087,593 B2 | 1/2012 | Leen |
| 8,091,796 B2 | 1/2012 | Amundson et al. |
| 8,167,216 B2 | 5/2012 | Schultz et al. |
| 8,219,249 B2 | 7/2012 | Harrod et al. |
| 8,239,066 B2 | 8/2012 | Jennings et al. |
| 8,332,178 B2 | 12/2012 | Simons |
| 8,434,023 B2 | 4/2013 | Ge |
| 9,477,239 B2* | 10/2016 | Bergman .............. G05D 23/19 |
| 2001/0025349 A1 | 9/2001 | Sharood et al. |
| 2001/0029585 A1 | 10/2001 | Simon et al. |
| 2001/0042684 A1 | 11/2001 | Essalik et al. |
| 2001/0052459 A1 | 12/2001 | Essalik et al. |
| 2002/0005435 A1 | 1/2002 | Cottrell |
| 2002/0011923 A1 | 1/2002 | Cunningham et al. |
| 2002/0022991 A1 | 2/2002 | Sharood et al. |
| 2002/0060701 A1 | 5/2002 | Naughton et al. |
| 2002/0082746 A1 | 6/2002 | Schubring et al. |
| 2002/0092779 A1 | 7/2002 | Essalik et al. |
| 2002/0096572 A1 | 7/2002 | Chene et al. |
| 2002/0138184 A1 | 9/2002 | Kipersztok et al. |
| 2002/0147804 A1 | 10/2002 | Cosmao et al. |
| 2002/0147806 A1 | 10/2002 | Haegawa |
| 2002/0171624 A1 | 11/2002 | Stecyk et al. |
| 2002/0173929 A1 | 11/2002 | Seigel |
| 2002/0198990 A1 | 12/2002 | Bradfield et al. |
| 2003/0000692 A1 | 1/2003 | Takaski et al. |
| 2003/0014179 A1 | 1/2003 | Szukala et al. |
| 2003/0033156 A1 | 2/2003 | McCall |
| 2003/0033230 A1 | 2/2003 | McCall |
| 2003/0034897 A1 | 2/2003 | Shamoon et al. |
| 2003/0034898 A1 | 2/2003 | Shamoon et al. |
| 2003/0070544 A1 | 4/2003 | Mulvaney et al. |
| 2003/0074489 A1 | 4/2003 | Steger et al. |
| 2003/0121262 A1 | 5/2003 | Godwin |
| 2003/0103075 A1 | 6/2003 | Rosselot |
| 2003/0121652 A1 | 7/2003 | Carey et al. |
| 2003/0123224 A1 | 7/2003 | LaCroix et al. |
| 2003/0136135 A1 | 7/2003 | Kim et al. |
| 2003/0142121 A1 | 7/2003 | Rosen |
| 2003/0150926 A1 | 8/2003 | Rosen |
| 2003/0150927 A1 | 8/2003 | Rosen |
| 2003/0177012 A1 | 9/2003 | Drennen |
| 2004/0193324 A1 | 3/2004 | Hoog et al. |
| 2004/0074978 A1 | 4/2004 | Rosen |
| 2004/0133314 A1 | 7/2004 | Ehlers et al. |
| 2004/0232345 A1 | 11/2004 | Jagam et al. |
| 2004/0245352 A1 | 12/2004 | Smith |
| 2004/0262410 A1 | 12/2004 | Hull |
| 2005/0033707 A1 | 2/2005 | Ehlers et al. |
| 2005/0083168 A1 | 4/2005 | Beitenbach |
| 2005/0086952 A1* | 4/2005 | Nonaka .............. F25B 49/005 62/129 |
| 2005/0095269 A1 | 5/2005 | Ainpour et al. |
| 2005/0109764 A1* | 5/2005 | Kopel .............. F24H 9/2071 219/494 |
| 2005/0130652 A1 | 6/2005 | O'Toole et al. |
| 2005/0164678 A1 | 6/2005 | Rezvani et al. |
| 2005/0228607 A1 | 10/2005 | Simons |
| 2005/0270151 A1 | 12/2005 | Winick |
| 2006/0032379 A1 | 2/2006 | Kates |
| 2006/0071086 A1 | 4/2006 | Kates |
| 2006/0149414 A1 | 7/2006 | Archacki, Jr. et al. |
| 2006/0168342 A1 | 7/2006 | Budde et al. |
| 2006/0186213 A1 | 8/2006 | Carey et al. |
| 2006/0196953 A1 | 9/2006 | Simon et al. |
| 2006/0219799 A1 | 10/2006 | Schultz et al. |
| 2006/0242591 A1 | 10/2006 | Van Dok et al. |
| 2007/0012052 A1* | 1/2007 | Butler .............. F24F 11/0009 62/181 |
| 2007/0013534 A1 | 1/2007 | DiMaggio |
| 2007/0029397 A1 | 2/2007 | Mueller et al. |
| 2007/0045429 A1 | 3/2007 | Chapman, Jr. et al. |
| 2007/0057079 A1 | 3/2007 | Stark et al. |
| 2007/0114293 A1 | 5/2007 | Gugenheim |
| 2007/0114295 A1 | 5/2007 | Jenkins |
| 2007/0277061 A1 | 11/2007 | Ashe |
| 2007/0278320 A1 | 12/2007 | Lunacek et al. |
| 2007/0289731 A1 | 12/2007 | Deligiannis et al. |
| 2008/0015740 A1 | 1/2008 | Osann, Jr. |
| 2009/0140056 A1 | 6/2009 | Leen |
| 2009/0140060 A1 | 6/2009 | Stoner et al. |
| 2009/0140062 A1 | 6/2009 | Amundson et al. |
| 2009/0143879 A1 | 6/2009 | Amundsom et al. |
| 2009/0143880 A1 | 6/2009 | Amundson et al. |
| 2009/0143916 A1 | 6/2009 | Boll et al. |
| 2009/0144015 A1* | 6/2009 | Bedard .............. G01K 3/04 702/130 |
| 2009/0165644 A1 | 7/2009 | Campbell |
| 2009/0199212 A1 | 8/2009 | Schneider |
| 2010/0008422 A1 | 1/2010 | Shimizu et al. |
| 2010/0044449 A1 | 2/2010 | Tessier |
| 2010/0070907 A1 | 3/2010 | Harrod et al. |
| 2010/0084482 A1 | 4/2010 | Kennedy et al. |
| 2010/0107112 A1 | 4/2010 | Jennings et al. |
| 2010/0118913 A1* | 5/2010 | Courtois .............. G01K 7/42 374/102 |
| 2010/0161574 A1 | 6/2010 | Davidson et al. |
| 2010/0197238 A1 | 8/2010 | Pathuri et al. |
| 2010/0204834 A1 | 8/2010 | Comerford et al. |
| 2010/0217406 A1 | 8/2010 | Berry, Jr. et al. |
| 2011/0061527 A1 | 3/2011 | Sullivan |
| 2011/0072492 A1 | 3/2011 | Mohler et al. |
| 2011/0078515 A1 | 3/2011 | Yasukawa |
| 2011/0093424 A1 | 4/2011 | Zimmermann et al. |
| 2011/0138328 A1 | 6/2011 | Ge |
| 2011/0190910 A1 | 8/2011 | Lombard et al. |
| 2011/0282937 A1 | 11/2011 | Deshpande et al. |
| 2012/0318073 A1 | 12/2012 | Zavodny et al. |
| 2012/0318135 A1 | 12/2012 | Hoglund et al. |
| 2012/0318137 A1 | 12/2012 | Ragland et al. |
| 2012/0318138 A1 | 12/2012 | Bisson et al. |
| 2012/0319851 A1 | 12/2012 | Hoglund et al. |
| 2012/0323374 A1 | 12/2012 | Dean-Hendricks et al. |
| 2012/0323375 A1 | 12/2012 | Dean-Hendricks et al. |
| 2012/0323377 A1 | 12/2012 | Hoglund et al. |
| 2013/0060385 A1* | 3/2013 | Leen .............. F24F 11/0009 700/276 |
| 2013/0073244 A1 | 3/2013 | Simons |
| 2013/0158717 A1* | 6/2013 | Zywicki .............. F24F 11/30 700/276 |
| 2013/0261807 A1* | 10/2013 | Zywicki .............. G05D 23/1905 700/278 |
| 2014/0174114 A1* | 6/2014 | Tamaki .............. F25B 45/00 62/129 |

FOREIGN PATENT DOCUMENTS

| | | |
|---|---|---|
| EP | 0434926 | 8/1995 |
| EP | 0678204 | 3/2000 |
| EP | 0985994 | 3/2000 |
| EP | 1033641 | 9/2000 |
| EP | 1074009 | 7/2001 |
| EP | 1143232 | 10/2001 |
| EP | 1196002 | 4/2002 |
| EP | 0848215 | 5/2004 |
| EP | 1196003 | 3/2009 |
| EP | 2138919 | 12/2009 |
| FR | 2711230 | 4/1995 |
| JP | 1159846 | 6/1989 |
| JP | 2002044750 | 2/2002 |
| WO | WO 97/11448 | 3/1997 |
| WO | WO 97/39392 | 10/1997 |
| WO | WO 99/65192 | 12/1999 |
| WO | WO 00/01169 | 1/2000 |
| WO | WO 00/43870 | 7/2000 |
| WO | WO 01/52515 | 7/2001 |
| WO | WO 01/79952 | 10/2001 |

(56) References Cited

FOREIGN PATENT DOCUMENTS

| WO | WO 01/93779 | 12/2001 |
|----|-------------|---------|
| WO | WO 02/23744 | 3/2002 |
| WO | WO 2010/021700 | 2/2010 |

OTHER PUBLICATIONS

"Comfort™ Programmable Owner's Manual," Carrier Touch-N-Go™, 60 pages, 2010. Catalog No. 0M-TCPHP-4CA, Replaces: OM-TCPHP-3CA.
"CorAccess Systems/In Home," http://web.archive.org/web20011212084427/www.coraccess.com/home.html, 1 page, copyright 2001, printed Aug. 19, 2004.
"HAI Company Background," http://www.homeauto.com/AboutHAI/abouthai_main.htm, 2 pages, printed Aug. 19, 2004.
"High-tech options take hold in new homes—200-08-28—Dallas Business Journal," http://bizjournals.com/dallas/stories/2000/08/28/focus4, 3 pages, dated Aug. 28, 2000, printed Aug. 19, 2004.
"Home Toys Review—TouchLinc", http://www.hometoys.com/htinews/aug99/reviews/touchlinc/touchlinc.htm, 3 pages, dated Aug. 1999, printed Aug. 20, 2004.
"HTI News Release," http://www.hometoys.com/htinews/apr99/releases/ha101.htm, 3 pages, Apr. 1999.
"Mark of Excellence Award Finalist Announced," http://64.233.167.104/search?Q=cache:ciOA2YtYaBIJ:www.hometoys.com/releases/mar . . . , 6 pages, Leopard Touchscreen on p. 2, dated prior to Mar. 4, 2000, printed Aug. 20, 2004.
"Product Review—Phillips Pronto Remote Control," http://hometheaterhifi.com/volume_6_2/philipsprontoremotecontrol.html, 5 pages, dated May 1999, printed Aug. 20, 2004.
"RC X10 Automation Forum: Control your Heating and Cooling System with Pronto(1/1)," http://www.remotecentral.com/cgi-bin/mboard/rc-x10/thread.cgi?12, 2 pages, dated Apr. 23, 1999, printed Aug. 20, 2004.
"RCS X10 Thermostat Plug-In for Home Seer Beta Version," 25 pages, Downloaded Sep. 9, 2011. 2.0.105.
"Spotlight on integrated systems," Custom Builder, V8, N2, p. 66(6), Mar.-Apr. 1993.
"Vantage Expands Controls for Audio/Video, HVAC and Security," http://www.hometoys.com/htinews/aug99/releases/vantage03.htm, 2 pages, dated Aug. 3, 1999, printed Aug. 20, 2004.
ADI, "Leopard User Manual," 93 pages, 2001.
Adicon 2500, "The Automator," 4 pages, Oct.-Dec. 2000.
ADT Security Services, "iCenter Advanced User Interface 8142ADT," Installation and Setup Guide, 4 pages, May 2001; First Sale Feb. 2001.
AED Electronics, Inc., "Presenting Climatouch the Most Innovative Thermostat in the World!," 2 pages, prior to Nov. 30, 2007.
Andrews et al., "Clicky: User-Centric Input for Active Spaces," 17 pages, Aug. 2004.
Aprilaire Electronic Thermostats Models 8344, 8346, 8348, 8363, 8365, 8366 Operating Instructions, 8 pages, 2003.
Aube Technologies, Electronic Thermostat for Heating System Model TH135-01, 5 pages, Aug. 14, 2001.
Aube Technologies, TH140-28 Electronic Programmable Thermostat, Installation Instructions and User Guide, pp. 1-4, Jan. 22, 2004.
AutomatedBuildings.com Article—"Thin Client" Solutions, "Pressure, Air Flow, Temperature, Humidity & Valves," Dwyer Instruments, Inc., 5 pages, printed Sep. 20, 2004.
Blake et al., "Seng 310 Final Project Demo Program" Illustration, 3 pages, Apr. 6, 2001.
Blake et al., "Seng 310 Final Project" Report, dated Apr. 6, 2001.
Blister Pack Insert from a Ritetemp 8082 Touch Screen Thermostat Product, 2 pages, 2002.
Braeburn Model 3000 Owner's Manual, pp. 1-13, 2001.
Braeburn Model 5000 Owners Manual, pp. 1-17, 2001.
BRK Electronics Maximum Protection Plus Ultimate Convenience Smoke Alarm, 24 pages, Sep. 2000.
BRK First Alert, User's Manual, Smoke and Fire Alarms, pp. 1-7, Nov. 2002.
Business Wire, "MicroTouch Specialty Products Group to Capitalize on Growing Market for Low-Cost Digital Matrix Touchscreens," p1174 (2 pages), Jan. 6, 1999.
Cardio Manual, available at http://www.secant.ca/En/Documentation/Cardio2é-Manual.pdf, Cardio Home Automation Inc., 55 pages, printed Sep. 28, 2004.
Cardio, by Secant; http://www.hometoys.com/htinews/apr98/reviews/cardio.htm, "HTINews Review," Feb. 1998, 5 pages, printed Sep. 14, 2004.
Carrier Microelectronic Programmable Thermostat Owner's Manual, pp. 1-24, May 1994.
Carrier TSTATCCRF01 Programmable Digital Thermostat, pp. 1-21, prior to Apr. 21, 2005.
Carrier, "Edge Performance Programmable Owner's Manual," 64 pages, 2007.
Carrier, "Programmable Dual Fuel Thermostats," Installation, Start-Up & Operating Instructions, pp. 1-12, Oct. 1998.
Carrier, "Programmable Thermostats," Installation, Start-Up & Operating Instructions, pp. 1-16, Sep. 1998.
Carrier, "Standard Programmable Thermostat," Homeowner's Manual, pp. 1-8 pages, 1998.
Carrier, "Thermidistat Control," Installation, Start-Up, and Operating Instructions, pp. 1-12, Aug. 1999.
Climatouch, User Manual, Climatouch CT03TSB Thermostat, Climatouch CT03TSHB Thermostat with Humidity Control, Outdoor UHF Temperature Transmitter 217S31, 19 pages, Printed Sep. 15, 2004.
U.S. Appl. No. 13/434,778, filed Mar. 29, 2012.
U.S. Appl. No. 13/227,395, filed Sep. 11, 2011.
U.S. Appl. No. 13/325,300, filed Dec. 14, 2011.
U.S. Appl. No. 13/325,315, filed Dec. 14, 2011.
U.S. Appl. No. 13/325,503, filed Dec. 14, 2011.
U.S. Appl. No. 13/325,515, filed Dec. 14, 2011.
U.S. Appl. No. 13/325,525, filed Dec. 14, 2011.
U.S. Appl. No. 13/325,554, filed Dec. 14, 2011.
U.S. Appl. No. 13/325,617, filed Dec. 14, 2011.
U.S. Appl. No. 13/326,553, filed Dec. 15, 2011.
U.S. Appl. No. 13/415,743, filed Mar. 8, 2012.
U.S. Appl. No. 13/420,120, filed Mar. 14, 2012.
CorAccess, "Companion 6," User Guide, pp. 1-20, Jun. 17, 2002.
Danfoss RT51/51RF & RT52/52RF User Instructions, 2 pages, Jun. 2004.
DeKoven et al., "Designing Collaboration in Consumer Products," 2 pages, 2001.
DeKoven et al., "Measuring Task Models in Designing Intelligent Products," 2 pages, Jan. 13-16, 2002.
DESA Heating Products, "Wireless Hand-Held Remote Control Sets Models (C) GHRCB and (C)GHRCTB, Operating Instructions," 4 pages, May 2003.
Domotique Secant Home Automation—Web Page, available at http://www.secant.ca/En/Company/Default.asp, 1 page, printed Sep. 28, 2004.
Emme Core User Guide, Version 1.1, 47 pages, Jan. 2011.
Firex Smoke Alarm, Ionization Models AD, ADC Photoelectric Model Pad, 4 pages, prior to Apr. 21, 2005.
Fluke, "561 HVAC Pro" Infrared Thermometer Users Manual, 22 pages, Downloaded May 24, 2012. 11-99.
Freudenthal et al., "Communicating extensive smart home functionality to users of all ages: the design of a mixed-initiative multimodal thermostat-interface," pp. 34-39, Mar. 12-13, 2001.
Gentex Corporation, HD135, 135° Fixed Temperature Heat Detector AC Pwered, 120V, 60Hz With Battery Backup, Installation Instructions—Owner's Information, pp. 1-5, Jun. 1, 1998.
Gentex Corporation, 9000 Series, Photoelectric Type Single Station/Multi-Station Smoke Alarms AC Powered With Battery Backup, Installation Instructions—Owner's Information, pp. 9-1 to 9-6, Jan. 1, 1993.
Harris et al., "Optimizing Memory Transactions," Microsoft Research Havard University, 12 pages, May 25, 2012.
Honeywell Brivis Deluxe Programmable Thermostat, pp. 1-20, 2002.

(56) References Cited

OTHER PUBLICATIONS

Honeywell Brivis T8602C Chronotherm IV Deluxe Programmable Thermostats, Installation Instructions, pp. 1-12, 2002.
Honeywell CT8602C Professional Fuel Saver Thermostat, pp. 1-6, 1995.
Honeywell Electronic Programmable Thermostat, Owner's Guide, pp. 1-20, 2003.
Honeywell Electronic Programmable Thermostats, Installation Instructions, pp. 1-8, 2003.
Honeywell News Release, "Honeywell's New Sysnet Facilities Integration System for Boiler Plant and Combustion Safety Processes," 4 pages, Dec. 15, 1995.
Honeywell T8002 Programmable Thermostat, Installation Instructions, pp. 1-8, 2002.
Honeywell T8602A,B,C,D and TS8602A,C Chronotherm III Fuel Saver Thermostats, Installation Instructions, pp. 1-12, 1995.
Honeywell T8602D Chronotherm IV Deluxe Programmable Thermostats, Installation Instructions, pp. 1-12, 2002.
Honeywell TH8000 Series Programmable Thermostats, Owner's Guide, pp. 1-44, 2004.
Honeywell, "Excel Building Supervisor-Integrated R7044 and FS90 Ver. 2.0," Operator Manual, 70 pages, Apr. 1995.
Honeywell, "Installation Guide: Wireless Entry/Exit Remote," 12 pages, 2011.
Honeywell, Wireless Entry/Exit Remote, Operating Manual, 9 pages, 2011.
Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
Honeywell, "RedLINK™ Wireless Comfort Systems," RedLINK Wireless Technology, 8 pages, Aug. 2011. 50-1194 PR.
Honeywell, "Total Connect Online Help Guide," Revision A, 800-02577-TC, Mar. 2010.
Honeywell, "Total Connect User Guide," Revision B, 34 pages, May 15, 2012. K14741.
Honeywell, "VisionPRO® 8000 Thermostats," Homeywell International Inc., 2 pages, Downloaded May 24, 2012. http://yourhome.honeywell.com.
Honeywell, "W7006A Home Controller Gateway User Guide," 31 pages, Jul. 2001.
Honeywell, MagicStat® CT3200 Programmable Thermostat, Installation and Programming Instructions, pp. 1-24, 2001.
http://www.cc.gatech.edu/computing/classes/cs6751_94_fall/groupc/climate-2/node1.html, "Contents," 53 pages, printed Sep. 20, 2004.
http://www.ritetemp.info/rtMenu_13.html, Rite Temp 8082, 6 pages, printed Jun. 20, 2003.
http://www.thermostatsales.com, Robertshaw, "9610 Digital Programmable Thermostat," 3 pages, printed Jun. 17, 2004.
http://www.thermostatsales.com, Robertshaw, "9700 Deluxe Programmable Thermostat" 3 pages, printed Jun. 17, 2004.
http://www.thermostatsales.com, Robertshaw, "9710 Deluxe Programmable Thermostat," 3 pages, printed Jun. 17, 2004.
http://www.thermostatsales.com, Robertshaw, "9720 Deluxe Programmable Thermostat," 3 pages, printed Jun. 17, 2004.
http://hunter-thermostats.com/hunter_programmable_thermostats.html, Hunter Thermostat 44668 Specifications, and 44758 Specifications, 2 pages, Printed Jul. 13, 2011.
Hunter, "44200/44250," Owner's Manual, 32 pages, prior to Jul. 7, 2004.
Hunter, "44300/44350," Owner's Manual, 35 pages, prior to Jul. 7, 2004.
Hunter, "Model 44758 Remote Sensor," Owner's Manual, 2 pages, Revision Sep. 4, 2008. Form No. 44044-01.
Hunter, "Auto Saver 550", Owner's Manual Model 44550, 44 pages, prior to Jul. 7, 2004.
Install Guide for Ritetemp Thermostat 8082, 6 pages, 2002.
Invensys™, "9700i 9701i 9715i 9720i Deluxe Programmable Thermostats," User's Manual, pp. 1-28, prior to Jul. 7, 2004.
Larsson, "Battery Supervision in Telephone Exchanges," Ericsson Components AB Sweden, 5 pages, Downloaded May 5, 2012. 9.14.
Lennox, "Network Control Panel (NCP)," User's Manual, 18 pages, Nov. 1999.
Lennox, "Prodigy Control System," Lennox Industries, 4 pages, May 25, 2012. (63W21)-01/11.
Logitech, "Harmony 880 Remote User Manual," v. 1, pp. 1-15, prior to Nov. 30, 2007.
Lux ELV1 Programmable Line Voltage Thermostat, Installation Instructions, 3 pages, prior to Jul. 7, 2004.
Lux TX500 Series Smart Temp Electronic Thermostat, 3 pages, prior to Jul. 7, 2004.
Lux TX9000 Installation, 3 pages, prior to Apr. 21, 2005.
Lux, "9000RF Remote Instructions," 2 pages, prior to Nov. 30, 2007.
Lux, "511 Series Smart Temp Electronic Thermostat," Owner's Manual, 3 pages, prior to Jul. 7, 2004.
Lux, "600 Series Smart Temp Electronic Thermostat," Owner's Manual, 3 pages, prior to Jul. 7, 2004.
Lux, "602 Series Multi-Stage Programmable Thermostat," Owner's Manual, 2 pages, prior to Jul. 7, 2004.
Lux, "605/2110 Series Programmable Heat Pump Thermostat," Owner's Manual, 3 pages, prior to Jul. 7, 2004.
Lux, "700/9000 Series Smart Temp Electronic Thermostat," Owner's Manual, 3 pages, prior to Jul. 7, 2004.
Lux, "PSPH521 Series Programmable Heat Pump Thermostat," Owner's Manual, 3 pages, prior to Jul. 7, 2004.
Lux, "TX1500 Series Smart Temp Electronic Thermostat," Owner's Manual, 6 pages, prior to Jul. 7, 2004.
Metasys, "HVAC PRO for Windows User's Manual," 308 pages, 1998.
Mounting Template for Ritetemp Thermostat 8082, 1 page, 2002.
OMRON Electronic Components, LLC, "Micro Tilt Sensor D6B," Cat. No. JB301-E3-01, 6 pages, Mar. 2005.
OMRON Electronic Components, LLC, "Micro Tilt Sensor D6B," Cat. No. B02WAD1, 2 pages, Jun. 2002.
Operation Manual for Ritetemp Touch Screen Thermostat 8082, 8 pages, 2002.
Proliphix, "Web Enabled IP Thermostats, Intelligent HVAC Control," Proliphix Inc., 2 pages, on or before Aug. 28, 2004.
Proliphix, "Web Enabled IP Thermostats, Ultimate in Energy Efficiency!," Proliphix Inc., 2 pages, on or before Aug. 28, 2004.
Proliphix, Inc., "NT10e & NT20e," 54 pages, on or before Aug. 30, 2005.
Quick Start Guide for Ritetemp Thermostat 8082, 1 page, 2002.
Remote Control Power Requirement for Ritetemp Thermostat 8082, 1 page, 2002.
Ritetemp Operation 8029, 3 pages, Jun. 19, 2002.
Ritetemp Operation 8050, 5 pages, Jun. 26, 2002.
Ritetemp Operation 8085, pp. 1-6, prior to Apr. 21, 2005.
Saravanan et al, "Reconfigurable Wireless Interface for Networking Sensors," IJCSNS International Journal of Computer Science and Network Security, vol. 8 No. 7, pp. 270-276. Revised Jul. 20, 2008.
Screenshot of http://lagotek.com/index.html?currentSection= TouchIt , Lagotek, 1 page, prior to Mar. 29, 2012.
Sealed Unit Parts Co., Inc., Supco & CTC Thermostats . . . loaded with features, designed for value!, 6 pages, prior to Apr. 21, 2005.
Sharp Corporation, "GP1S036HEZ Phototransistor Output, Transmissive Photointerrupter with Tilt Direction (4-Direction) Detecting," pp. 1-11, Oct. 3, 2005.
SmartAC, "Thermostat Programming Web Site Guide," PG-WC-7E, 2 pages, 2009.
Totaline Model P474-1035 Owner's Manual Programmable 5-2 Day Digital Thermostat, pp. 1-21, Apr. 2003.
Totaline Star CPE230RF, Commercial Programmable Thermostat Wireless Transmitter, Owner's Manual, pp. 1-16, Oct. 1998.
Totaline Star P/N P474-0130 Non-Programmable Digital Thermostat Owner's Manual, pp. 1-22, prior to Apr. 21, 2005.
Totaline, "1 For All Programmable Digital Thermostat," Owner's Manual P/N P374-1100FM, 23 pages, Nov. 1998.
Totaline, "1 For All Programmable Digital Thermostat," Owner's Manual P/N P474-1050, 21 pages, Nov. 1998.

(56) References Cited

OTHER PUBLICATIONS

Totaline, "1 For All Programmable Digital Thermostat," Owner's Manual P/N P374-1100, 24 pages, Apr. 2001.
Totaline, "Intellistat Combination Temperature and Humidity Control," Owner's Manual P/N P374-1600, 25 pages, Jun. 2001.
Totaline, "P/N P374-0431 Thermostat Remote Control and Receiver," Owner's Manual, 11 pages, prior to Nov. 30, 2007.
Totaline, "P474-1100RF, P474-1100REC Wireless Thermostat," 1 page, prior to Nov. 30, 2007.
Totaline, "Programmable Thermostat Configurable for Advanced Heat Pump or Dual Fuel Operation," Owner's Manual P/N P374-1500, 24 pages, Jun. 1999.
Totaline, "Wireless Remote Sensor, Model P474-0401-1RF/REC," 2 pages, prior to Nov. 30, 2007.
Totaline, "Instructions P/N P474-1010", Manual, 2 pages, Dec. 1998.
Totaline, "Programmable Thermostat", Homeowner's Guide, 27 pages, Dec. 1998.
Totaline, "Wireless Programmable Digital Thermostat," Owner's Manual 474-1100RF, 21 pages, 2000.
Trane, "System Programming, Tracer Summit Version 14, BMTW-SVP01D-EN," 623 pages, 2002.
Trane, "Wireless Zone Sensor. Where Will Wireless Technology Take You?," 4 pages, Feb. 2006.
Travis Industries, Remote Fireplace Thermostat, Part #99300651, 6 pages, printed Feb. 3, 2003.
Trouble Shooting Guide for Ritetemp Thermostat 8082, 1 page, 2002.
Visor Handheld User Guide, 280 pages, Copyright 1999-2000.
Warmly Yours, "Model TH111GFCI-P (120 VAC)," Manual, pp. 1-4, prior to Jul. 7, 2004.
White-Rodgers 1F80-224 Programmable Electronic Digital Thermostat, Installation and Operation Instructions, 8 pages, prior to Apr. 21, 2005.
White-Rodgers Comfort-Set III Thermostat, pp. 1-44, prior to Jul. 7, 2004.
White-Rodgers Installation Instructions for Heating & Air Conditioning IF78 Non-Programmable Thermostat, 6 pages, prior to Apr. 21, 2005.
White-Rodgers Installation Instructions for Heating & Air Conditioning IF78 5/2 Day Programmable Thermostat, 7 pages, prior to Jul. 7, 2004.
White-Rodgers, "Installation Instructions for Heating & Air Conditioning IF72 5/2 Day Programmable Heat Pump Thermostat," 8 pages, prior to Jul. 7, 2004.
White-Rodgers, "Comfort-Set 90 Series Thermostat," Manual, pp. 1-24, prior to Jul. 7, 2004.
White-Rodgers, 1F80-240 "(for Heating Only systems) Programmable Electronic Digital Thermostat," Installation and Operation Instructions, 8 pages, prior to Jul. 7, 2004.
White-Rodgers, 1F80-241 "Programmable Electronic Digital Thermostat," Installation and Operation Instructions, 6 pages, prior to Jul. 7, 2004.
White-Rodgers, 1F80-261 "Programmable Electronic Digital Thermostat," Installation and Operation Instructions, 8 pages, prior to Jul. 7, 2004.
White-Rodgers, 1F81-261 "Programmable Electronic Digital Multi-Stage Thermostat," Installation and Operation Instructions, 8 pages, prior to Jul. 7, 2004.
White-Rodgers, 1F82-261 "Programmable Electronic Digital Heat Pump Thermostat," Installation and Operation Instructions, 8 pages, prior to Jul. 7, 2004.
White-Rodgers, Comfort-Set 90 Series Premium, 4 pages, prior to Apr. 21, 2005.
www.icmcontrols.com, Simplecomfort, SC3000 Single Stage Heat/Single Stage Cool or Single Stage Heat Pump/Manual Changeover, 1 page, prior to Jul. 7, 2004.
www.icmcontrols.com, Simplecomfort, SC3001 Single Stage Heat/Single Stage Cool or Single Stage Heat Pump/Manual Changeover, 1 page, prior to Jul. 7, 2004.
www.icmcontrols.com, Simplecomfort, SC3006 Single Stage Heat/Single Stage Cool or Single Stage Heat Pump/Manual Changeover, 1 page, prior to Jul. 7, 2004.
www.icmcontrols.com, Simplecomfort, SC3201 2 Stage Heat Pump Manual Changeover, 1 page, prior to Jul. 7, 2004.
www.icmcontrols.com, Simplecomfort, SC3801 2 Stage Heat/2 Stage Cool 2 Stage Heat Pump/Audio Changeover, 1 page, prior to Jul. 7, 2004.
"RTCA's E-Smart Radon Monitoring Service," Radon Testing Corporation of America, 3 pages, prior to Jan. 11, 2006.
Clapman et al., "An SNMP-Based Approach for Home Bus Network Management," Proceedings of the International Conference on Consumer Electronics, 4 pages, Jun. 8-10, 1992.
U.S. Appl. No. 13/743,163, filed Jan. 16, 2013.
Polaroid, "PhotoMAX Digital Picture Frame," User's Guide, 25 pages, prior to Jan. 16, 2013.
Westinghouse, "DPF-0702 Widescreen Digital Photo Frame," User's Manual, 46 pages, prior to Jan. 16, 2013.

\* cited by examiner

AUTO TEST FOR DELTA T DIAGNOSTICS IN AN HVAC SYSTEM

TECHNICAL FIELD

The present disclosure relates generally to HVAC systems, and more particularly, to HVAC controllers that may be used for controlling HVAC systems.

BACKGROUND

Heating, ventilation, and/or air conditioning (HVAC) systems are often used to control the comfort level within a building or other structure. Such HVAC systems typically include an HVAC controller that controls various HVAC components of the HVAC system in order to affect and/or control one or more environmental conditions within the building. The performance of HVAC systems tends to degrade over time, fail, or otherwise operate in a less than ideal manner, which can produce undesirable results.

SUMMARY

This disclosure relates generally to HVAC systems, and more particularly, to HVAC controllers that may be used for controlling such HVAC systems. In one illustrative embodiment, an HVAC controller configured to control one or more components of an HVAC system may include a memory, an I/O block and a controller. The I/O block may be configured to receive one or more signals from an HVAC system including one or more signals related to a delta T parameter value of the HVAC system. The I/O block may also be configured to provide one or more control signals to the HVAC system, including one or more control signals to activate the HVAC system. The controller may be programmed to initiate a delta T test that is configured to: provide one or more control signals to activate the HVAC system; monitor the one or more signals related to the delta T parameter value; determine when a rate of change of the delta T parameter value falls below a threshold value indicating a stabilized delta T parameter value; and record the stabilized delta T parameter value in the memory. In some cases, the controller may record the run time in the memory in addition to the stabilized delta T parameter value.

In some cases, the controller may be programmed to initiate a delta T test sequence in response to a request received via a user interface, and once initiated, execute a delta T test for each valid equipment stage combination of the HVAC system. Each delta T test may include, for example: starting a timer to monitor an elapsed time; providing one or more control signals to activate a first/next valid equipment stage combination of the HVAC system; monitoring the one or more signals related to the delta T parameter value; determining when a rate of change of the delta T parameter value falls below a threshold value, indicating a stabilized delta T parameter value at a stabilized elapsed time; and recording the stabilized delta T parameter value and the stabilized elapsed time in the memory.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which.

Figure 1:
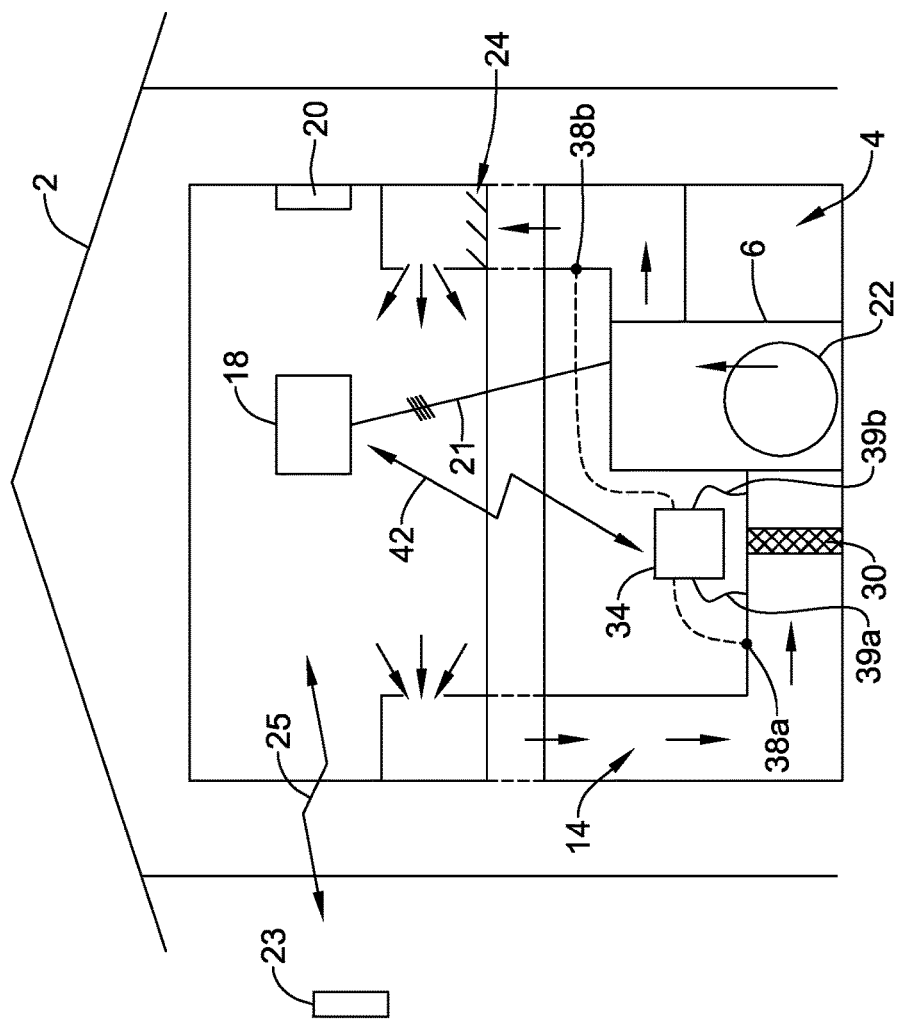
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit aspects of the disclosure to the particular examples described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several illustrative embodiments which are meant to illustrative in nature.

FIG. 1 is a schematic view of a building 2 having an illustrative heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 includes one or more HVAC components 6, a system of ductwork and air vents including a supply air duct 10 and a return air duct 14, and one or more HVAC controllers 18. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that the HVAC controller(s) 18 may be configured to control the comfort level in the building or structure by activating and deactivating the HVAC component(s) 6 in a controlled manner. The HVAC controller(s) 18 may be configured to control the HVAC component(s) 6 via a wired or wireless communication link 21. In some cases, the HVAC controller(s) 18 may be a thermostat, such as, for example, a wall mountable thermostat, but this is not required in all embodiments. Such a thermostat may include (e.g. within the thermostat housing) or have access to a temperature sensor for sensing an ambient temperature at or near the thermostat. In some instances, the HVAC controller(s) 18 may be a zone controller, or may include multiple zone controllers each monitoring and/or controlling the comfort level within a particular zone in the building or other structure.

An illustrative HVAC controller, which is not meant to be limiting in any way, is disclosed in: US Published Patent Application No. 20090140062, entitled "HVAC CONTROLLER THAT SELECTIVELY REPLACES OPERATING INFORMATION ON A DISPLAY WITH SYSTEM STATUS INFORMATION"; US Published Application No. 20090143880, entitled "HVAC CONTROLLER WITH CONTEXT SENSITIVE HELP SCREENS"; US Published Application No. 20090143918, entitled "METHOD AND APPARATUS FOR CONFIGURING AN HVAC CONTROLLER"; US Published Application No. 20090143916, entitled "HVAC CONTROLLER HAVING A PARAMETER ADJUSTMENT ELEMENT WITH A QUALITATIVE INDICATOR"; US Published Application No. 20090143879, entitled "HVAC CONTROLLER WITH PARAMETER CLUSTERING"; US Published Application No. 20090140056, entitled "HVAC CONTROLLER WITH QUICK SELECT FEATURE," the entireties of which are incorporated herein by reference for all purposes.

In some cases, the HVAC system 4 may include an internet gateway or other device 20 that may permit the HVAC controller 18, as described herein, to communicate over a wired or wireless network 25 with a remote device 23. In some cases, the network 25 may be a wireless local area network (WLAN) or a wide area network (WAN) such as, for example, the Internet. The remote device 23 may be used to access and communicate with the HVAC controller(s) 18 from a remote location outside of and away from the building 2. The remote device 23 may be any one of a smartphone, PDA, tablet computer, laptop computer, or personal computer. These are just some examples.

In the illustrative HVAC system 4 shown in FIG. 1, the HVAC component(s) 6 may provide heated air (and/or cooled air) via the ductwork throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14.

In some cases, the system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially open position to modulate the flow of air from the one or more HVAC components to an appropriate room and/or zone in the building or other structure. The dampers 24 may be particularly useful in zoned HVAC systems, and may be used to control which zone(s) receives conditioned air from the HVAC component(s) 6.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 34. When provided, the equipment interface module 34 may be configured to measure or detect a change in a given parameter between the return air side and the discharge air side of the HVAC system 4. For example, the equipment interface module 34 may be adapted to measure a difference in temperature, flow rate, pressure, or a combination of any one of these parameters between the return air side and the discharge air side of the HVAC system 4. In some cases, the equipment interface module 34 may be adapted to measure the difference or change in temperature (delta T) between a return air side and discharge air side of the HVAC system 4 for the heating and/or cooling mode. The delta T for the heating mode may be calculated by subtracting the return air temperature from the discharge air temperature (e.g. delta T=discharge air temp−return air temp). For the cooling mode, the delta T may be calculated by subtracting the return air temperature from discharge air temperature (e.g. delta T=return air temp−discharge air temp).

In some cases, the equipment interface module 34 may include a first temperature sensor 38a located in the return (incoming) air duct 14, and a second temperature sensor 38b located in the discharge (outgoing or supply) air duct 10. Alternatively, or in addition, the equipment interface module 34 may include a differential pressure sensor including a first pressure tap 39a located in the return (incoming) air duct 14, and a second pressure tap 39b located downstream of the air filter 30 to measure a change in a parameter related to the amount of flow restriction through the air filter 30. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

When provided, the equipment interface module 34 may be configured to communicate with the HVAC controller 18 via, for example, a wired or wireless communication link 42. In other cases, the equipment interface module 34 may be incorporated or combined with the HVAC controller 18. In either cases, the equipment interface module 34 may communicate, relay or otherwise transmit data regarding the selected parameter (e.g. temperatures, pressures, flow rate, etc.) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a measure related to the current operating performance of the HVAC system 4.

Figure 2:
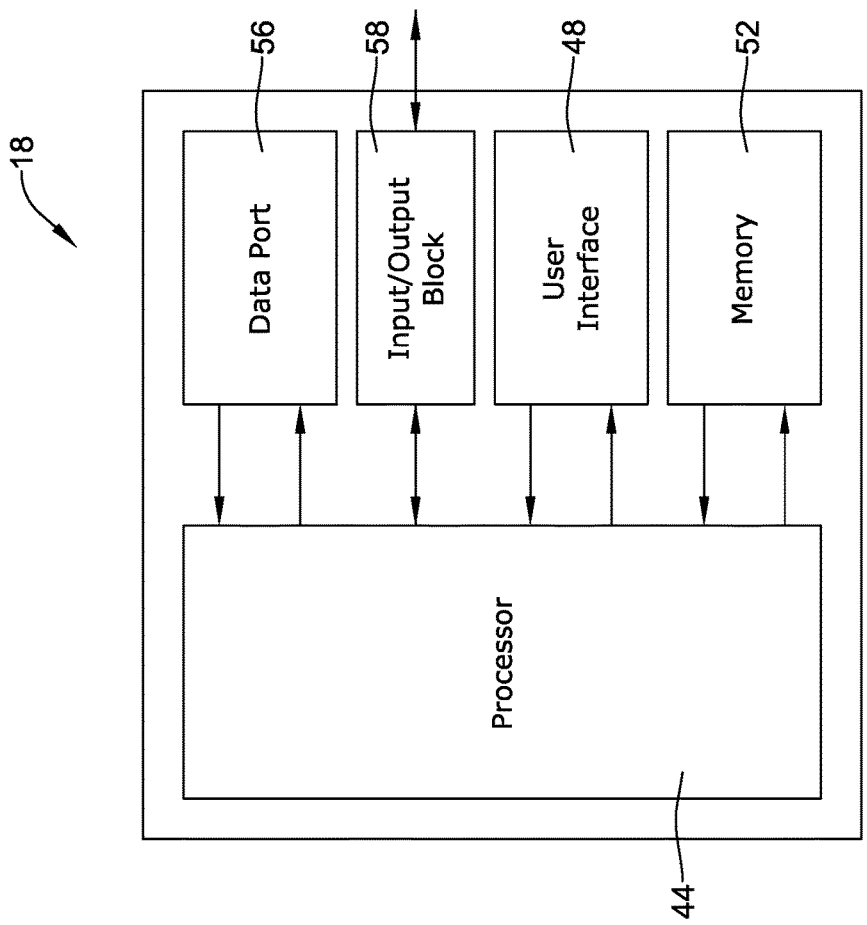
FIG. 2 is a schematic view of an illustrative HVAC controller.

FIG. 2 is a schematic view of an illustrative HVAC controller 18. In some instances, HVAC controller 18 may be a thermostat, but this is not required. In the illustrative embodiment of FIG. 2, HVAC controller 18 includes a processor (e.g. microprocessor, microcontroller, etc.) 44, a user interface 48, and a memory 52. In some cases, the HVAC controller 18 may optionally include an input/output block (I/O block) 58 for receiving one or more signals from the HVAC system and/or for providing one or more control signals to the HVAC system. In some cases, the one or more signals received from the HVAC system by the I/O block 58 may be related to a delta T parameter value of the HVAC system. The I/O block 58 may communicate with one or more HVAC components 6 of the HVAC system 4. Alternatively, or in addition, the I/O block 58 may communicate with a remote device over a wired or wireless network that is available within the building 2.

The processor 44 may operate in accordance with an algorithm that controls or at least partially controls one or more HVAC components 6 of an HVAC system such as, for example, HVAC system 4 shown in FIG. 1. The processor 44 may, for example, operate in accordance with an algorithm that provides temperature set points, starting and/or ending times, and the like. In some cases, HVAC controller 18 may include a timer (not shown). The timer may be integral to the processor 44 or may be provided as a separate component.

In some cases, the processor 44 may be programmed to initiate a delta T test in response to a request received from, for example, a user via the I/O block 58. In other cases, the HVAC controller 18 may be programmed to self-initiate a delta T test, such as in accordance with a programmed schedule, when a sensed parameter falls outside of a predetermined range (e.g. cycle time of a heating cycle rises above 15 minutes), and/or in response to any other suitable predetermined conditions. In some instances, and once a delta T test is initiated, the processor 44 may be configure to execute a delta T test for each equipment stage combination of the HVAC system, and to determine both a run time and a delta T parameter value for each equipment stage for both heating and cooling, as applicable. In some cases, the HVAC system 4 may include two or more equipment stage combinations. In some cases, the processor 44 may be programmed to automatically execute a delta T test for each equipment stage combination of the HVAC system 4 without receiving any further input from the user.

Upon initiation of the delta T test, the processor 44 may start a timer, and may transmit one or more control signals via the I/O block 58 to activate one or more HVAC components 6 of the HVAC system 4. During the delta T test, the processor 44 may monitor one or more signals indicative of a delta T parameter value received from the HVAC system 4. The processor 44 may also monitor the amount of time that has elapsed for the delta T test for each equipment stage combination. The delta T parameter value and run time determined for each equipment stage combination may be based, at least in part, on a stabilized delta T parameter value. The processor 44 may determine that the delta T parameter value is a stabilized delta T parameter value when a rate of change of the delta T parameter value falls below a predetermined threshold value. For example, in one instance, the processor 44 may determine that the delta T parameter value is stable for an individual equipment stage combination of the HVAC system 4 when the delta T value changes less than about one degree over a forty-five second period of time. The processor 44 may be programmed to record both the stabilized delta T parameter value and the run time for each equipment stage combination of the HVAC system 4 in the memory 52. It will be generally understood that the delta T parameter value and the run time may be different for each equipment stage. In some cases, the processor 44 may be further configured to notify the user when the delta T test is complete for each equipment stage combination of the HVAC system 4. In some cases, the processor 44 may be configured to notify the user when the delta T test is complete for each individual stage and/or when the delta T test is complete for all stages. The processor 44 may notify the user by, for example, displaying a message on the user interface and/or transmitting a message via the I/O block 58 to a remote device.

In the illustrative embodiment of FIG. 2, the user interface 48 may be any suitable user interface that permits HVAC controller 18 to display and/or solicit information, as well as accept one or more user interactions with the HVAC controller 18. In the example shown, the user interface 48 may permit a user to enter data such as temperature set points, humidity set points, starting times, ending times, diagnostic limits, tests requests, conditions under which diagnostic limits may be suspended, responses to alerts, and/or the like. Additionally, the user interface may permit a user to initiate a delta T test and other tests. In some cases, user interface 48 may include a display and a distinct keypad. A display may be any suitable display. In some instances, the display may include or may be a liquid crystal display (LCD), and in some cases a fixed segment display or a dot matrix LCD display. If desired, the user interface 48 may be a touch screen LCD panel that functions as both display and keypad. In some instances, a touch screen LCD panel may be adapted to solicit values for a number of operating parameters and/or to receive such values, but this is not required.

In some instances, the user interface 48 need not be physically accessible to a user at the HVAC controller 18. Instead, the user interface 48 may be a virtual user interface 48 that is accessible over the network 25 using a remote wireless device such as a smart phone, PDA, tablet computer, laptop computer, or personal computer. In some cases, the virtual user interface 48 may display one or more web pages that are broadcasted over the network 25 by an internal web server implemented by the processor 44 or by an external web service to which the HVAC controller 18 may be connected. An example of such an external web service is Honeywell, Inc.'s TOTAL CONNECT™ web service. When so provided, the virtual user interface 48 may be accessed over the network 25 using a remote wireless device 23. Through the one or more web pages, the processor 44 may be configured to display information relevant to the current operating status of the HVAC system 4 including the current operating mode, temperature set point, actual temperature within the building, outside temperature, outside humidity and/or the like. In some cases, the processor 44 may be configured to receive and accept any user inputs entered via the virtual user interface 48 including temperature set points, humidity set points, starting times, ending times, schedule times, window frost protection settings, diagnostic limits, tests requests, responses to alerts, and/or the like. In some cases, the virtual user interface 48 may be provided by an application program (sometimes known as an app) that is downloaded to the remote wireless device.

The memory 52 of the illustrative HVAC controller 18 may be in communication with the processor 44. The memory 52 may be used to store any desired information, such as the aforementioned control algorithm, set points, schedule times, diagnostic limits such as, for example, differential pressure limits, delta T limits, delta T parameter values for each equipment stage combination, run times, and/or the like. The memory 52 may be any suitable type of storage device including, but not limited to, RAM, ROM, EPROM, flash memory, a hard drive, and/or the like. In some cases, the processor 44 may store information within memory 52, and may subsequently retrieve the stored information from the memory 52.

In some cases, as illustrated in FIG. 2, HVAC controller 18 may include a data port 56. The data port 56 may be a wireless port such as a cellular communication port, a ZigBee port, REDLINK™ port, a Bluetooth port, a WiFi port, an IrDA port, a dedicated short range communication (DSRC) port, an EnOcean port, and/or any other suitable common or proprietary wireless protocol, as desired. In other cases, the data port 56 may be a wired port such as a serial port, a parallel port, a CAT5 port, a USB (universal serial bus) port, and/or the like. In some instances, the data port 56 may be a USB port and may be used to download and/or upload information from a USB flash drive or some other data source. Other remote devices may also be employed, as desired.

The data port 56 may be configured to communicate with the processor 44 and may, if desired, be used to upload information to the processor 44 and/or download information from the processor 44. Information that can be uploaded and/or downloaded may include, for example, values of operating parameters. In some instances, the data port 56 may be used to upload a previously-created thermostat configuration into HVAC controller 18, thereby hastening the programming process. In some cases, the data port 56 may be used to download a thermostat configuration that has been created using HVAC controller 18, so that the thermostat configuration may be transferred to other similar thermostats, hastening their programming process. In some cases, the data port 56 may be used to upload and/or download information pertaining to an HVAC dealer or contractor, if desired.

In some cases, the data port 56 may be used to download data stored within the memory 52 for analysis. For example, the data port 56 may be used to download a faults and/or alerts log or parts thereof to a remote device such as a USB memory stick (also sometimes referred to as a thumb drive or jump drive), personal computer, laptop, iPAD® or other tablet computer, PDA, smart phone, or other remote device, as desired. In some cases, the data may be convertible to an MS EXCEL®, MS WORD®, text, XML, and/or Adobe PDF® file, but this is certainly not required. In other cases, data stored in the memory 52 may be uploaded to and/or downloaded from an external web service such as, for example, Honeywell Inc.'s TOTAL CONNECT™, hosted by an external web server over a wired or wireless network via the I/O block 58.

Figure 3:
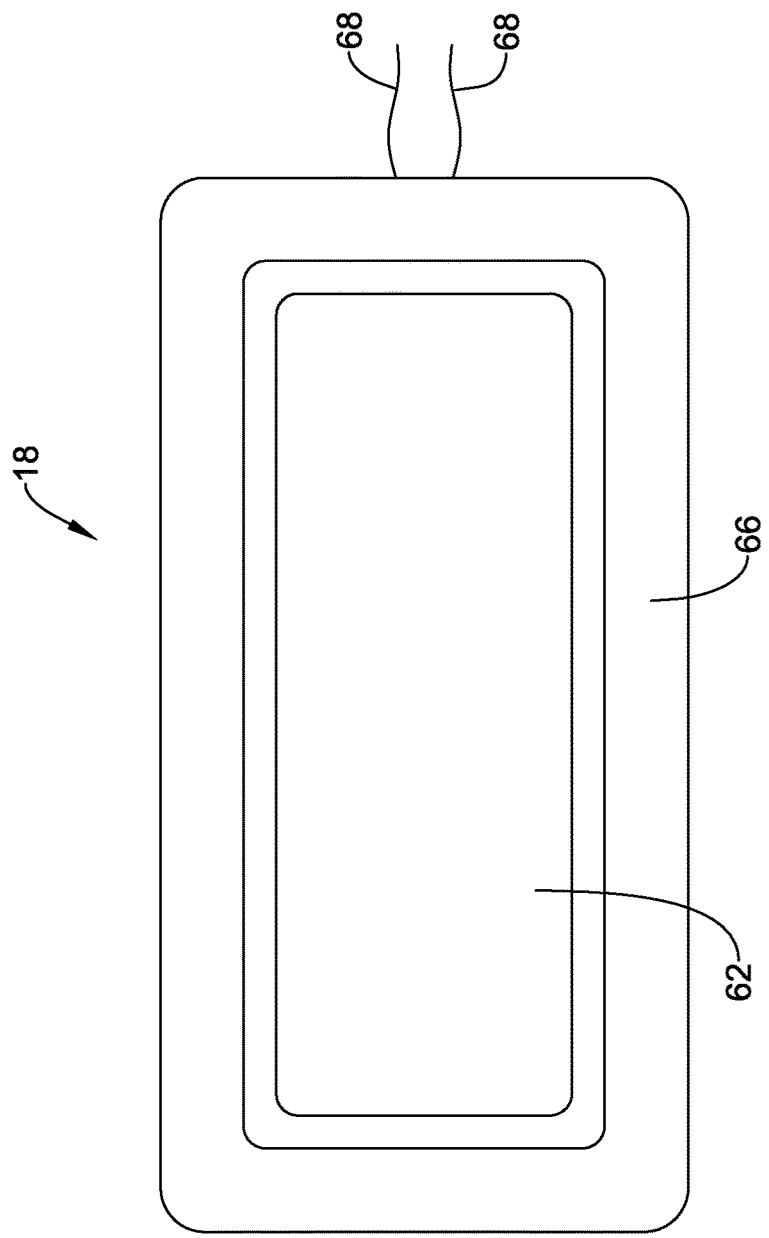
FIG. 3 is a front view of an illustrative HVAC controller.

FIG. 3 is a front view of an illustrative HVAC controller 18. In the illustrative embodiment shown in FIG. 3, the HVAC controller 18 includes a display 62 that is disposed within a housing 66 but viewable externally from the housing 66. In some cases, the display 62 may be a touch screen LCD display. If desired, the display 62 may be a dot matrix touch screen LCD display. A dot matrix touch screen LCD display is a touch screen LCD that permits images such as letters, numbers, graphics, images, and the like to be displayed anywhere on the LCD, rather than being confined to predetermined locations such as is the case with a fixed segment type of LCD display. The housing 66 may be formed of any suitable material, such as a polymeric material. In some cases, the housing 66 may be formed such that it defines a data port 56 (see FIG. 2). The housing 66 may also include suitable wiring and/or other electrical connections 68 such that the HVAC controller 18 may be electrically coupled to the HVAC system 4.

Figure 4:
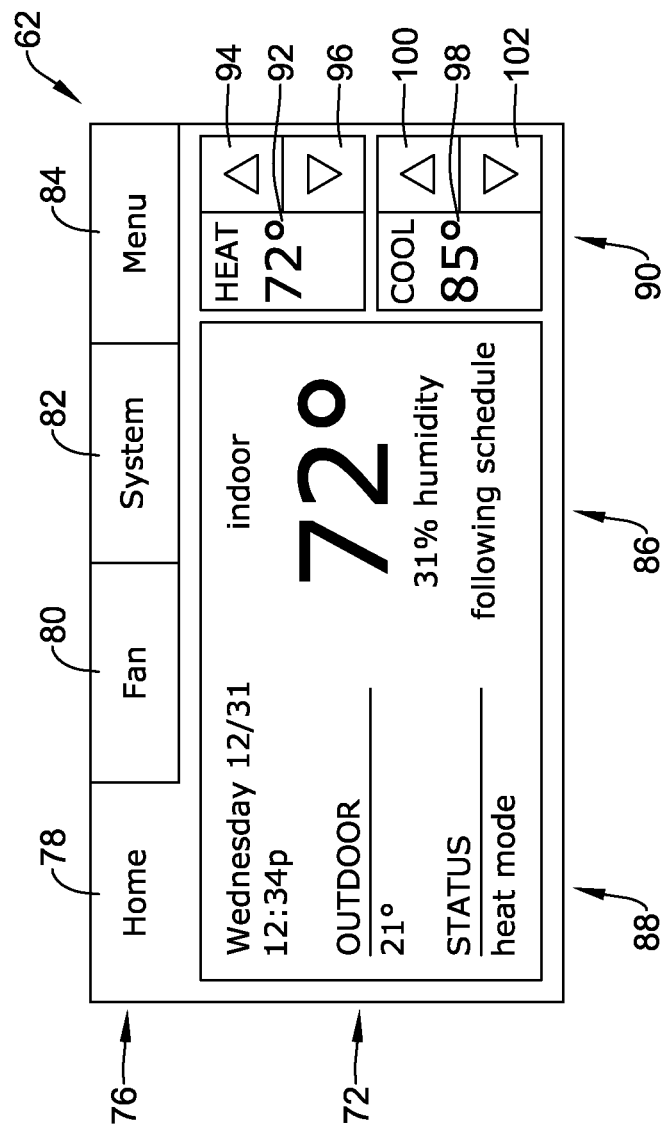
FIG. 4 provides an illustrative example of a home screens that may be displayed upon the HVAC controllers of FIGS. 2 and 3.

In the illustrative example, the HVAC controller 18 may be configured to provide substantial display and/or programming functionality. In some cases, the HVAC controller 18 may be configured to display a default display, referred to herein as a home screen, that is displayed by HVAC controller 18 when no other data entry is underway for a period of time. FIG. 4 provides an exemplary home screen 72 that may be displayed by HVAC controller 18. In some cases, the home screen 72 may include screens that can be accessed by a top level navigational menu. The home screen 72 may, if desired, display one or more parameters relating to environmental conditions such as indoor and/or outdoor air temperature and/or humidity, expected weather conditions, and/or the status of equipment that is at least partially controlled by the HVAC controller 18. In some instances, the home screen 72 may display a user alert that may indicate that the system is not operating properly or that a routine maintenance such as, for example, a filter change, is desirable, but this is not required.

FIG. 4 is an example of a screen that may be displayed after a user has pushed HOME button 78, or when no other data entry is underway for a period of time. In many cases, the illustrative home screen 72 of FIG. 4 may include a navigational bar 76 along the top. The navigational bar 76 may be considered as providing top level navigation. In some cases, if desired, the navigational bar 76 may include one or more of a HOME button 78, a FAN button 80, a SYSTEM button 82 and/or a MENU button 84. In the illustrative embodiment, the user may access one or menus from which the user may make a temperature set point change, a humidity set point change, an indoor air quality change, a programmable schedule change, a system mode change, a fan setting change, an installer set-up change, initiate a testing procedure, among others. Such user entries may be considered a user interaction.

In some cases, the home screen 72 may be considered as having two or more regions. For example, the home screen 72 may include a first region 86 and a second region 88. In some instances, the first region 86 may be considered as displaying or otherwise providing primary information, while the second region 88 may be considered as displaying or otherwise providing secondary information. In some cases, primary information may be information that is considered to be more important, more interesting and/or more useful than secondary information. To illustrate, the first region 86 may display one or more of a current air temperature reading, a current indoor humidity, a schedule status, and the like. The second region 88 may display one or more of a date and time, an outdoor air temperature reading, an outdoor humidity reading, an equipment status, and the like.

The home screen 72 may also include a third region 90 that may be used for displaying and/or adjusting a parameter value such as a parameter that is displayed within first region 86 of home screen 72. In some cases, for example, the third region 90 may, as illustrated, display both a heating temperature set point and a cooling temperature set point, but this is not required. The third region 90 may display a first parameter 92, a first up arrow 94 and a first down arrow 96. The third region 90 may also display a second parameter 98, a second up arrow 100 and a second down arrow 102. The first parameter 92 may be adjusted up or down by a user using first up arrow 94 and/or first down arrow 96, as appropriate. The second parameter 98 may be adjusted up or down by a user using second up arrow 100 and/or second down arrow 102, as desired.

In some cases, the HVAC controller 18 may be configured to display a user alert on the display 62 which may prompt the user to take action. In one case, a user alert may be displayed when the processor 44 determines that system maintenance is needed. For example, the processor 44 may determine that a filter change is necessary, a battery change is necessary, a UV bulb change is necessary or some other maintenance is necessary that requires a user's attention. In another case, the HVAC controller 18 may display a user alert indicating that the HVAC system 4 is operating outside of a predetermined set of "normal" operating parameters. Such an alert, for example, may be displayed when the HVAC system 4 has exceeded a predetermined delta T limit stored in the controller memory 52 for either a heating or a cooling mode. The predetermined delta T limit may be determined by an installer based, at least in part, on the result of a delta T test initiated by the installer and executed by the processor 44. A user's response (or, in some cases, absence of a response) to an alert may be considered a user interaction. In some cases, a user's interactions with HVAC system may be recorded and stored in a user interaction log contained within the controller memory 52.

FIGS. 5-11 provide several example screens that may be displayed upon the HVAC controllers 18 of FIGS. 2 and 3 to initiate a delta T test of a connected HVAC system. In some cases, if the user (e.g. installer) is utilizing a remote device (e.g. remote device 23 of FIG. 1) to access and/or control the HVAC controller of FIGS. 2 and 3, an application program code (sometimes referred to as an app) stored in the memory of the remote device 23 may cause the remote device 23 to display a similar set of screens, thereby providing a virtual user interface for the user to interact with the HVAC controller 18 and/or HVAC system 4. As discussed herein, it is contemplated that the remote device 23 may be a smartphone, PDA, tablet computer, laptop computer, personal computer, or any other suitable remote device. The remote device 23 may be configured to transmit and receive data to and from the HVAC controller 18 over a wired or wireless network. In some cases, the remote device may be configured to transmit and receive data to and from the HVAC controller 18 via a remote server. It will be generally understood by those of skill in the art that the user may initiate a delta T test either at the HVAC controller 18 and/or through a virtual user interface provided by a remote device 23. Diagnostic limits may be determined, based at least in part, on one or more delta T tests executed by the processor 44 for each equipment stage combination. In some instances, the determination of certain diagnostic limits for the HVAC system may occur during initial installation and set-up of at least some of the HVAC components 6 of the HVAC system 4. In other cases, determining diagnostic limits and/or changing the diagnostic limits for the HVAC system 4 may occur during routine maintenance or inspection of the HVAC system 4, or at any other suitable time as desired. In some cases, the HVAC controller 18 may be programmed to self-initiate a delta T test, such as in accordance with a programmed schedule, when a sensed parameter falls outside of a predetermined range (e.g. cycle time of a heating cycle rises above 15 minutes), and/or in response to any other suitable predetermined conditions.

Figure 5:
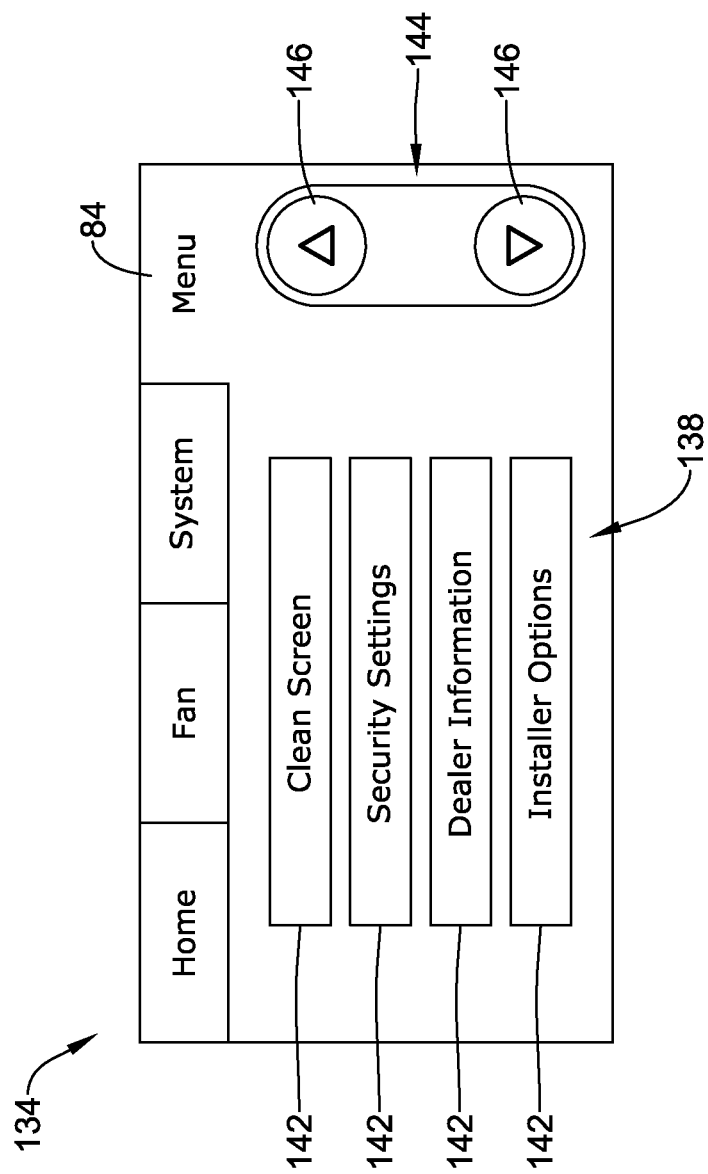
FIGS. 5-11 provide several example screens that may be displayed upon the HVAC controllers 18 of FIGS. 2 and 3 to initiate a delta T test of a connected HVAC system.

FIG. 5 shows an illustrative example of a menu screen 134 that may be displayed when a user selects the MENU button 84 on the home screen 72 of FIG. 4. It is contemplated that the menu screen 134 may be displayed at the HVAC controller 18 and/or the remote device 23. The illustrative menu screen 134 may include a table 138 that includes one or more selectable menu options 142 that may be selected by the user. In some cases, the table 138 may be a scrolling table, in which case the menu screen 134 may also include a scroll bar 144 including first and second arrows 146*a*, 146*b* that may facilitate a user in scrolling through the available menu options 142.

Figure 6:
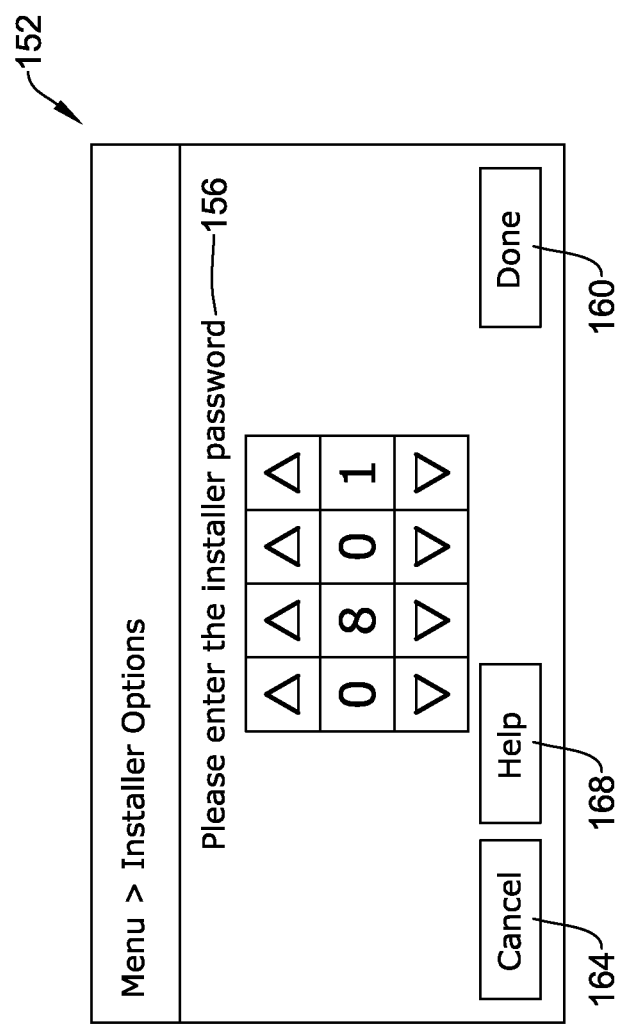

In some cases, and upon selection of the INSTALLER OPTIONS menu option 142, the illustrative HVAC controller 18 (and/or the remote device 23) may be configured to display a password prompt screen 152, as illustrated in FIG. 6. The password prompt screen 152 may include a user prompt 156 that may prompt the user to enter a user login ID which may include a user name and/or password. In some cases, certain rights may be associated with different user login IDs or passwords. For example, a homeowner may have a different login ID, with different associated rights than an HVAC contractor. The user login ID and/or password may include any combination of alphanumeric characters in the example shown. In one example, as illustrated in FIG. 6, the password may be a sequence of numbers. The sequence of numbers may be adjusted to the correct sequence by using the corresponding arrow keys. When properly set, the user may select the DONE button 160 to confirm entry of the user login ID. In some cases, the password prompt screen 152 may include a CANCEL button 164 which, upon its selection, may cancel the user's current actions and return the user to the previous screen, such as the menu screen 134 of FIG. 5. In some cases, the password prompt screen 152 may include a HELP button 168. Selection of the HELP button 168 may cause the HVAC controller 18 to display additional information about the currently displayed screen, such as information on how to use the password prompt screen 152. Sometimes this information screen may appear on an additional screen or a pop-up screen that overlays the current screen, but this is not required.

Figure 7:
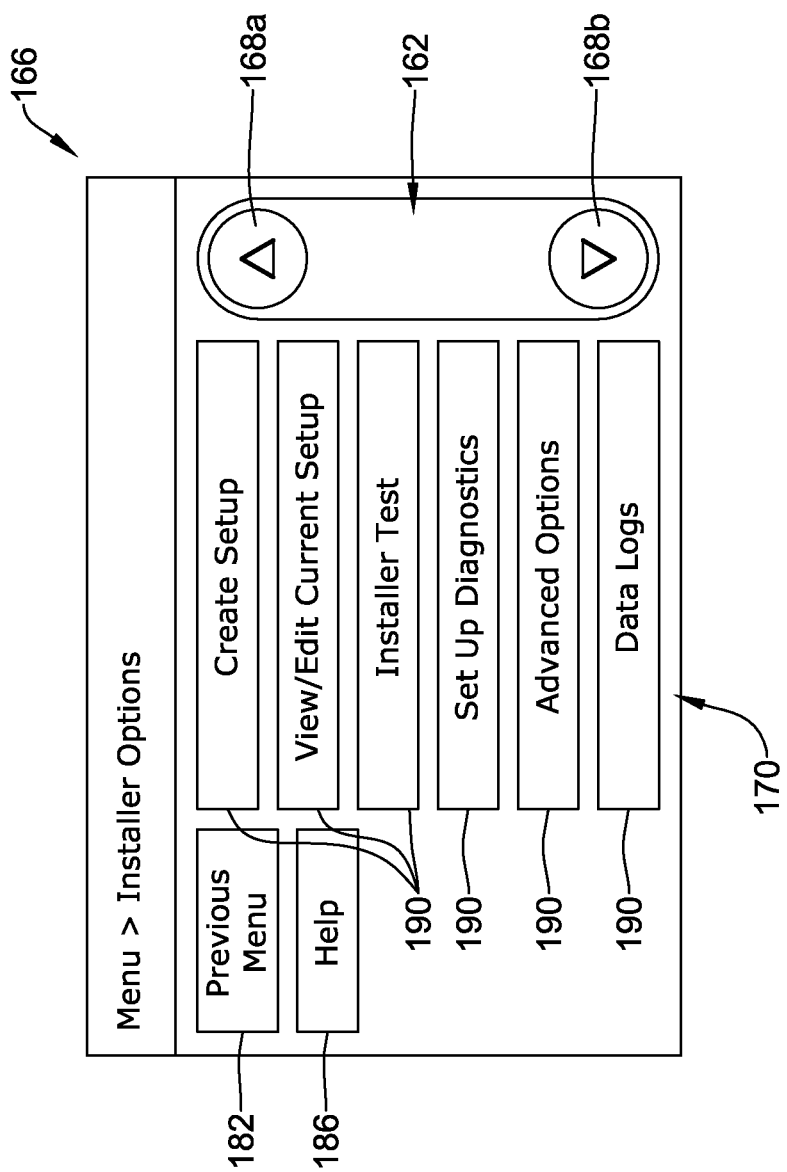

Upon selection of the DONE button 160 confirming entry of a password, the HVAC controller 18 may confirm that a valid password has been entered. If a valid password has been entered, the HVAC controller 18 (and/or the remote device 23) may display an installer options menu screen 166, such as illustrated in FIG. 7. Like the previous menu screen 134, the installer options menu screen 166 may include a table 167 including one or more installer options. In some cases, the table 170 may be a scrolling table, in which case the installer options menu screen 166 may also include a scroll bar 162 having first and second arrows 168*a*, 168*b* that may facilitate a user to scroll through and view the available installer options presented in table 170. The installer options menu screen 166 may also include a BACK button or PREVIOUS MENU button 182 which, when selected, may cause menu screen 134 of FIG. 5 to be displayed. Additionally, in some cases, the installer options menu screen 166 may include a HELP button 186, which when selected, may cause additional information pertaining to the currently displayed screen to be displayed, such as information on how to use the installer options menu screen 166.

In many cases, the table 170 may include one or more installer options 190 that may be selected by the user. In some cases, a CREATE SETUP installer option 190 may be provided, which may provide access to a series of successive installer set-up screens that may query the installer to specify one or more setup parameters relating to the system setup for the particular HVAC system 4. Selection of this option may be appropriate when the user is initially setting up the HVAC system prior to operation. For example, in some instances, the series of successive screens may query the user regarding parameters related to HVAC systems and their setup including, but not limited to: the type of HVAC system (e.g. zoned or non-zoned), the type of heating system (e.g. conventional forced, air, heat pump, radiant heat, to name a few), the type of heating equipment (e.g. standard efficiency gas forced air, high efficiency gas forced air, electric forced air, etc.), the number of equipment stages for each of the cooling system and heating system, the temperature ranges (e.g. minimum and maximum set points) for both heating and cooling, what sensors are included in the HVAC system (e.g. indoor air temperature, outdoor air temperature, return air temperature sensor, discharge air temperature sensor, etc.), the number of air filters, whether not the HVAC system includes a humidifier, the type of humidifier (if applicable), whether or not the HVAC system includes a dehumidifier, ventilation, the number and type of UV devices (if applicable), among others. These are just some examples. The HVAC controller 18 may be programmed to accept one or more set up parameters selected by the user via the CREATE SETUP installer option 190 or the VIEW/EDIT installer set up option. At least one of the set up parameters may correspond to a number of equipment stages of the HVAC system 4. In some instances, the HVAC controller 18 may be configured to automatically detect the various components of the HVAC system and parameters indicative of the system setup. Still, in other instances, the user may view and/or edit the current setup by selecting the VIEW/EDIT CURRENT SETUP menu option 190 which may facilitate the user in viewing and/or making changes to previously entered and/or detected setup parameters.

The following illustrative figures and examples will be described as they relate to a conventional forced air system including a return air temperature sensor (RATS) (e.g. RATS 38a of FIG. 1) and a discharge air temperature sensor (DATS) (e.g. DATS 38b of FIG. 1). In some instances, the HVAC system may include a humidifier, a dehumidifier, ventilation, an outdoor air temperature sensor, an outdoor humidity sensor, an indoor humidity sensor, and/or any other suitable sensor or component, as desired. More specifically, FIGS. 8-10 provide examples of several illustrative screens that may be displayed by the HVAC controller 18 (and/or the remote device 23) after the installer has indicated through their responses to the queries presented by the previous screens that the HVAC system is a conventional forced air HVAC system including at least a return air temperature sensor and a discharge air temperature sensor.

In many cases, after the current setup of the HVAC system has been established either through creation of a new setup or by editing an existing set up, as discussed herein, the installer may return to the installer options menu screen 166 to select one or more additional options. For example, the table 170 provided on the installer options menu screen 166 may include an INSTALLER TEST installer option 190, which may provide access to one or more installer tests that may be initiated by the installer. Selection of this option may be appropriate when the installer desires to run a number of tests including one or more tests to identify delta T parameter values and run times for each equipment stage combination of the HVAC system 4, as applicable. The delta T parameter values and run times determined through testing may be used by the installer to determine and/or set delta T limits and run time limits for delta T diagnostics prior to operation of the HVAC system 4. In some cases, in response to selection of the INSTALLER TEST installer option 190 by a user, the HVAC controller 18 may be configured to automatically execute a delta T test. When more than one stages are present in the HVAC system 4, the HVAC controller 18 may be configured to automatically execute a delta T test for one or more equipment stage combinations.

In some instances, the HVAC controller 18 may be configured to automatically execute a delta T test for each equipment stage combination of the HVAC system 4, sometimes for both heating stages and cooling stages, without receiving any further input by the user. The HVAC controller 18 may determine, for example, the run time and the delta T parameter value for each equipment stage combination of the HVAC system 4 based, at least in part, on a stabilized delta T parameter value. During the test, the HVAC controller 18 may monitor the delta T parameter value and determine when the delta T parameter value has stabilized for each equipment stage combination test. In some cases, the HVAC controller 18 may determine that a delta T parameter value is stable T when the delta T parameter value experiences less than about a one degree change in value over a about a forty-five second period of time. When the HVAC controller 18 determines that the delta T parameter value is stable for a first stage (e.g. Heat Stage 1), the controller 18 may automatically proceed to a next equipment stage combination and repeat the testing until testing for all valid equipment stage combinations of the HVAC system 4, as applicable, has been completed. The HVAC controller 18 may record the run time and delta T parameter value for each equipment stage combination and store the run times and delta T parameter values in the memory 52.

Figure 8:
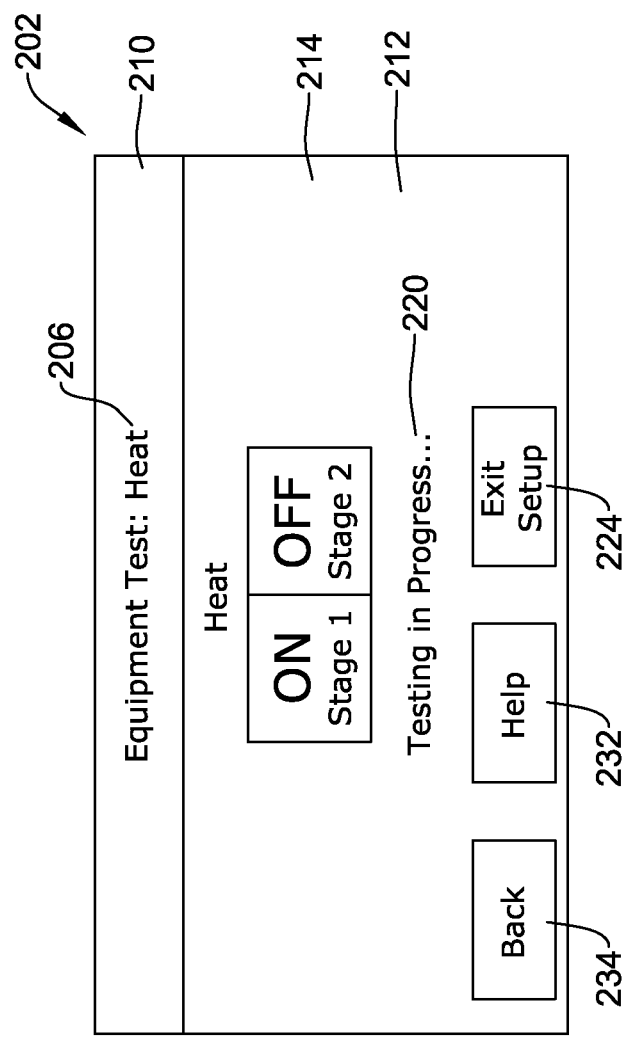
Figure 9:
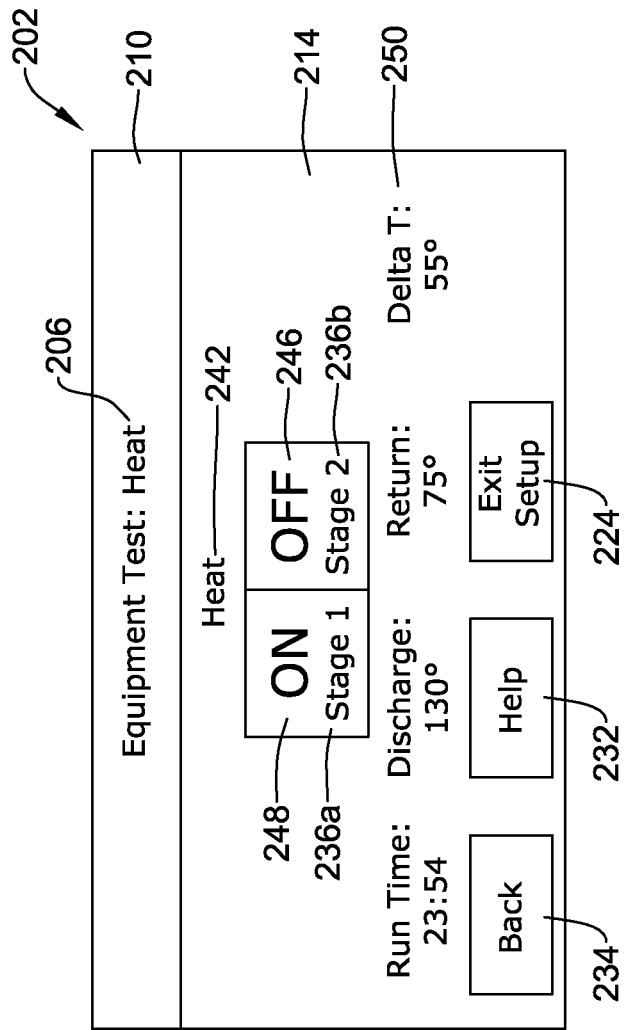
Figure 10:
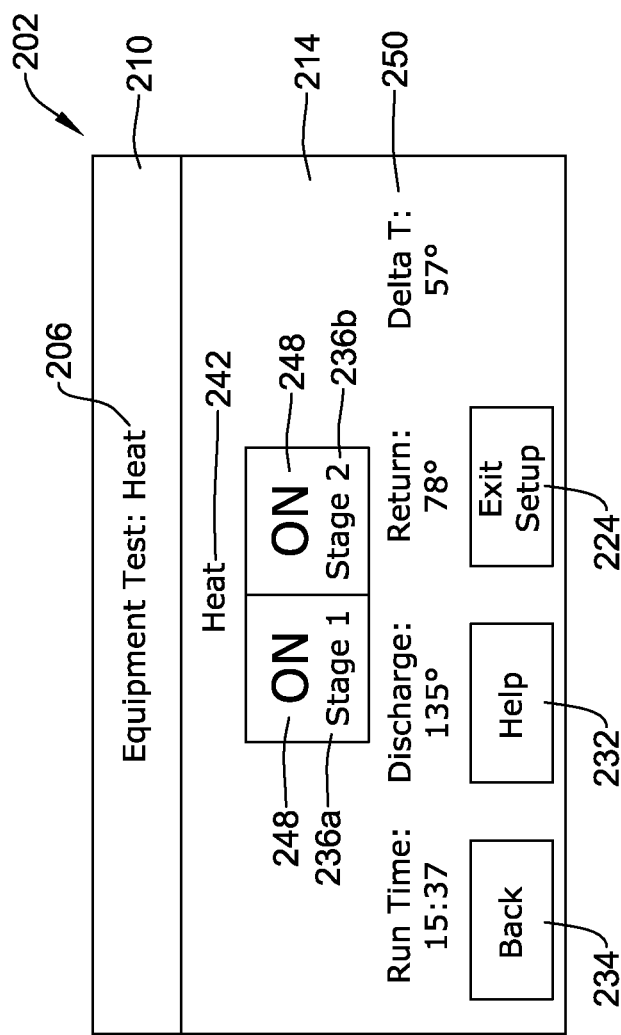

FIGS. 8-10 provide examples of several installer test screens that may be displayed by the HVAC controller 18 upon initiation of at least one installer test that may be used to identify a stable delta T parameter value and run time for each equipment mode (e.g. heat and cool) and stage combination of the HVAC system 4. The delta T parameter values and run times identified through the diagnostic test may be used to determine a minimum and maximum delta T limit upon which a delta T fault may be based, at least in part, for each mode (e.g. heat and cool) and stage combination of the HVAC system 4. In some cases, the diagnostic test may be initiated automatically for each mode (e.g. heat and cool) and/or stage combination of the HVAC system 4.

FIGS. 8-10 show an installer test screen 202 that may be displayed by the HVAC controller 18 upon selection of, for example, the INSTALLER TEST installer option 190 provided on a previous user query screen such as, for example, installer options menu screen 166 shown in FIG. 7. FIG. 8 shows the installer test screen 202 after initiation of the installer test. FIGS. 9-10 show installer test screen 202 while the installer test is active for different equipment stage combinations of the HVAC system 4. In some instances, the HVAC controller 18 may be programmed to automatically initiate a diagnostics test for each mode (e.g. heat and cool, when both are present) and/or stage combination of the HVAC system 4 upon selection of the INSTALLER TEST installer option 190, without receiving any further input from the user, but this is not required.

In the example shown, the installer test screen 202 may include a first banner 206 provided along a top portion 210 of screen 202 that may identify the equipment mode (e.g. heat or cool) for which the delta T test relates. Installer test screen 202 may also include a second banner 212 provided in a middle region 214 of screen 202 that may display a user message 220, which may indicate to the user that, for example, testing is in progress. In addition, installer test screen 202 may include an EXIT SETUP button 224 that, when selected, may cause the HVAC controller 18 to exit the testing procedure and return to a home screen such as, for example, home screen 72 as shown in FIG. 4. The installer test screen 202 may include a HELP button 232 that, when selected, may cause HVAC controller 18 to display additional information about the use of the current screen. The installer test screen 202 may display a BACK button 234 that, when selected, may cause HVAC controller 18 to display a previous screen, such as screen 166 shown in FIG. 7.

As shown in FIGS. 8-10, the installer test screen 202 may include an ON/OFF button 236a, 236b that may be highlighted (e.g. bolded, shaded, grayed-out, bolded outline, flashing, etc.) to indicate that the installer test is actively running for that stage. A separate ON/OFF button (e.g. ON/OFF buttons 236a, 236b) may be provided for each stage of the mode (heating or cooling) for which the installer test is being run. As such, for a single stage heating system, only one ON/OFF button relating to the heat mode may be provided. For a three stage heating system, three ON/OFF buttons relating to the heat mode may be provided. As shown in FIGS. 8 and 9, an ON/OFF button 236a, 236b is provided for both a stage 1 and a stage 2 of the heating mode, such that an installer test may be initiated separately for each heating stage/stage combination. When testing the first stage (e.g. stage 1), the HVAC controller 18 may automatically proceed to testing the next stage combination (e.g. stage 1 and stage 2). In addition, the diagnostics test screen may include a label 242 identifying the current operating mode of the HVAC system (e.g. cool or heat). The label 242 may appear adjacent the ON/OFF buttons 236a, 236b as shown in the illustrative examples provided in FIGS. 8-10. When an installer test for a selected mode and/or stage combination is not active, the ON/OFF button 236a and/or 236b may include an OFF label 246. When the installer test for a selected mode and/or stage combination is active, the ON/OFF button 236a and/or 236b may include an ON label 248, such as shown in FIGS. 9 and 10. Additionally, the ON/OFF button 236a and/or 236b may be shaded, grayed out, include a bolded outline or otherwise highlighted to indicate that the installer test is actively running for that stage or stage combination. In some cases, the ON/OFF buttons 236a, 236b may be selected (e.g. by touching them) to force a test for a particular stage or stage combination.

During testing for an equipment stage or stage combination, the HVAC controller 18 may monitor the delta T parameter value and the run time. The HVAC controller 18 may determine when a stabilized delta T parameter value is reached, and may record and store the stabilized delta T parameter value and the run time in the memory 52 of the HVAC controller 18. In some cases, and as best shown in FIGS. 9-10, the HVAC controller 18 may be configured to display a current total run time for a delta T test, a current discharge air temperature, a current return air temperature, and/or a current delta T parameter value for the selected mode and/or stage combination of the HVAC system 4 that is being evaluated. In some instances, and as shown in FIGS. 9-10, some or all of these values may be included in a third banner 250 that may be displayed on the installer test screen 202. In some cases, these values may be displayed in the form of a chart or graph, if desired.

The HVAC controller 18 may be programmed to repeatedly update the current total run time, the current discharge air temperature, the current return air temperature, and/or the current delta T parameter value for the HVAC system 4 displayed on the installer test screen 202 during the installer test. The user (e.g. installer) may monitor the displayed values during the test. The user may terminate the test at any time by selecting the EXIT SETUP button 224. The HVAC controller 18 may terminate the test when testing for each stage is complete. In some cases, completion of a test for each stage/stage combination is determined by the HVAC controller 18 when the current discharge air temperature, return air temperature, and/or the delta T parameter values that are displayed on the diagnostics test screen 202 stabilize and do not substantially change over a predetermined amount of time. In one example, the HVAC controller 18 may determine that a test for a particular stage or stage combination is complete when the delta T parameter values exhibit less than about a one degree change over a forty five second period of time. This is just one example. In some cases, when testing is determined to be complete for a first stage/stage combination (FIG. 9), the HVAC controller 18 may automatically proceed to a next stage/stage combination for testing (FIG. 10) without any further input from the user.

Figure 11:
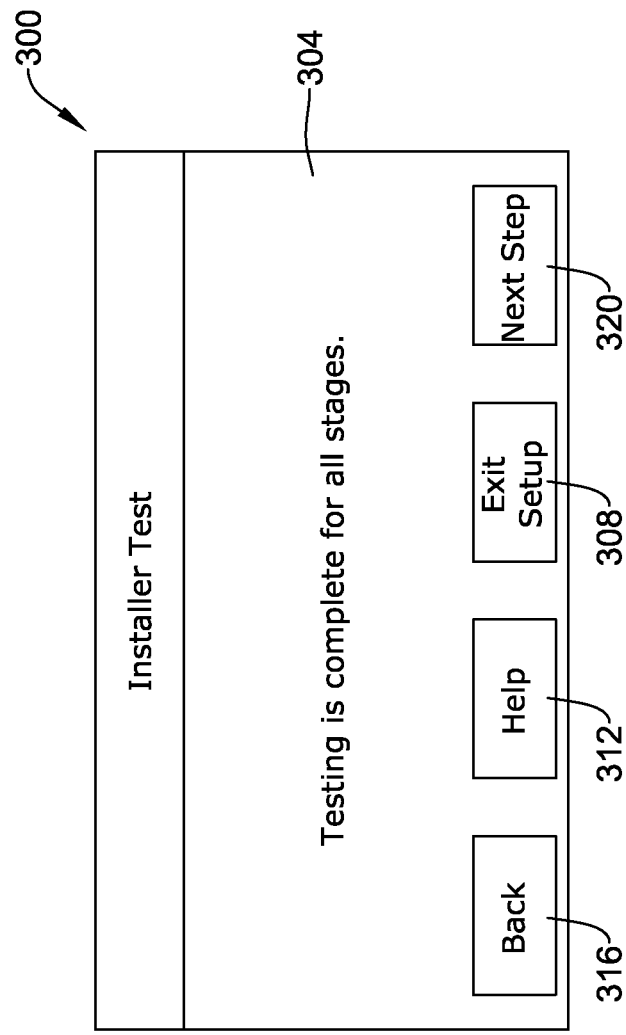

In some instances, the HVAC controller 18 may notify the user when testing is completed for all valid equipment stage combinations of the HVAC system 4. FIG. 11 provides an illustrative user notification screen 300 that may be displayed by the HVAC controller 18 after a test has been completed for each valid equipment stage combination of the HVAC system 4. As can be seen, the user notification screen 300 may include a user notification message 304 that may notify the user that the testing is completed for all stages. Additionally, the user notification screen 300 may include an EXIT SETUP button 308 that, when selected, may cause the HVAC controller 18 to return to a home screen such as, for example, home screen 72 as shown in FIG. 4. The user notification screen 300 may also include a HELP button 312 that, when selected, may cause HVAC controller 18 to display additional information about the use of the current screen. The user notification screen may display a BACK button 316 that, when selected, may cause HVAC controller 18 to display a previous screen, such as screen 202 shown in FIG. 10. In some instances, such as when the user is accessing the HVAC controller using a remote device such as, for example, remote device 23 of Figure, the HVAC controller 18 may be programmed to transmit a text message, SMS message, email, or other notification to the remote device such as, for example, remote device 23 indicating that testing is complete.

In some instances, the user notification screen 300 may also include a NEXT STEP button 320 that, when selected by the user, may cause the HVAC controller 18 to display one or more screens related to setting diagnostic limits based, at least in part, on the delta T parameter values and run times as determined by the installer test for each equipment stage combination of the HVAC system 4. In some cases, the delta T parameter values and run times as determined by the installer tests may be displayed for each valid stage/stage combination, sometimes in a table format. In some cases, diagnostic limits are automatically determined from the test, and the HVAC controller 18 may automatically assign the diagnostic limits as default values. In some cases, the user (e.g. installer) may use the stabilized delta T parameter values and the run times determined by the HVAC controller 18 during the installer test to set and/or adjust the default delta T limits and appropriate run time settings. This approach may save time, and may reduce errors during the setup of the HVAC system 4.

It should be understood that while the illustrative example provide in FIGS. 8-11 relate to initiating and executing a diagnostics test for each stage of a heating mode of an HVAC system 4, similar screens may be displayed for initiating and executing a diagnostics test for each stage of a cooling mode of an HVAC system 4, as applicable. Additionally, it should be understood that if the user (e.g. installer) is utilizing a remote device (e.g. remote device 23 of FIG. 1) to access and/or control the HVAC controller 18, an application program code (sometimes referred to as an app) stored in the memory of the remote device 23 may cause the remote device 23 to display a similar set of screens providing a virtual user interface for the user to interact with the HVAC controller 18 and/or HVAC system 4. As discussed herein, the remote device 23 may be any one of a smartphone, PDA, tablet computer, laptop computer, a personal computer or any other suitable remote device. The remote device 23 may be configured to transmit and receive data to and from the HVAC controller 18 over a wired or wireless network.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. An HVAC controller configured to control one or more components of an HVAC system, the HVAC controller comprising:
    a memory;
    an I/O block, for receiving one or more signals from the HVAC system including one or more signals related to a delta T parameter value of the HVAC system, wherein the delta T parameter represents a difference in air temperature between a return air side and a discharge air side of the HVAC system, and for providing one or more control signals to the HVAC system including one or more control signals to activate the HVAC system; and
    a controller operatively coupled to the memory and the I/O block, the controller programmed to initiate a delta T test that is configured to, without further user input:
        provide one or more control signals to activate the HVAC system;
        monitor the one or more signals related to the delta T parameter value;
        determine the delta T parameter value;
        monitor a rate of change of the delta T parameter value;
        determine when the rate of change of the delta T parameter value falls below a threshold value, indicating a stabilized delta T parameter value; and
        record the stabilized delta T parameter value in the memory.

2. The HVAC controller of claim 1 further comprising a user interface, and wherein the delta T test is initiated in response to a request made by a user via the user interface.

3. The HVAC controller of claim 1, wherein the controller is further configured to, without further user input:
    monitor an elapsed time of the delta T test before the rate of change of the delta T parameter value falls below the threshold value; and
    record the elapsed time in the memory.

4. The HVAC controller of claim 3 further comprising a user interface having a display, wherein the controller is further programmed to repeatedly update and display the delta T parameter value and the elapsed time on the display of the user interface during the delta T test.

5. The HVAC controller of claim 1, further comprising a user interface having a display, wherein the controller is further programmed to repeatedly update and display the delta T parameter value on the display during the delta T test.

6. The HVAC controller of claim 1, wherein the controller is further programmed to accept one or more installer set up parameters, and wherein at least one of the installer set up parameters corresponds to a number of equipment stages of the HVAC system.

7. The HVAC controller of claim 6, wherein the controller is further programmed to automatically execute the delta T test for each of two or more valid equipment stage combinations of the HVAC system without further input from a user.

8. The HVAC controller of claim 7, wherein the controller is further programmed to record a stabilized delta T for each of the two or more valid equipment stage combinations.

9. The HVAC controller of claim 8, wherein the controller is further configured to monitor an elapsed time until the rate of change of the delta T parameter value falls below the threshold value for each of the two or more valid equipment stage combinations, and records the corresponding elapsed times in the memory.

10. The HVAC controller of claim 1, wherein the controller is further programmed to display a notification on a display, notifying the user that the delta T test is complete.

11. The HVAC controller of claim 1, wherein the HVAC controller is a wireless thermostat that includes a temperature sensor.

12. An HVAC controller configured to control one or more components of an HVAC system, the HVAC controller comprising:
    a memory;
    an I/O block, for receiving one or more signals from the HVAC system including one or more signals related to a delta T parameter value of the HVAC system, wherein the delta T parameter represents a difference in air temperature between a return air side and a discharge air side of the HVAC system, and for providing one or more control signals to the HVAC system including one or more control signals to activate the HVAC system;
    a user interface;
    a controller operatively coupled to the memory, the I/O block and the user interface, the controller programmed to initiate a delta T test sequence in response to a request received via the user interface, and once initiated and without further user input, to execute a delta T test for each valid equipment stage combination of the HVAC system, each delta T test including:
        starting a timer to monitor an elapsed time;
        providing one or more control signals to activate a first/next valid equipment stage combination of the HVAC system;
        monitoring the one or more signals related to the delta T parameter value;
        determining the delta T parameter value;
        monitoring a rate of change of the delta T parameter value;
        determining when the rate of change of the delta T parameter value falls below a threshold value, indicating a stabilized delta T parameter value at a stabilized elapsed time; and recording the stabilized delta T parameter value and the stabilized elapsed time in the memory.

13. The HVAC controller of claim 12, wherein the controller further provides a notification via the user interface when the delta T test for all of the valid equipment stage combinations is complete.

14. The HVAC controller of claim 12, wherein the controller repeatedly updates and displays a current delta T parameter value on the user interface during the delta T test for each valid equipment stage combination of the HVAC system.

15. The HVAC controller of claim 14, wherein the controller repeatedly updates a current elapsed time on the user interface during the delta T test for each valid equipment stage combination of the HVAC system.

16. The HVAC controller of claim 12, wherein the controller records the stabilized delta T parameter value and the stabilized elapsed time in the memory for a first equipment stage combination before executing a delta T test for a second equipment stage combination.

17. A method of monitoring a performance of an HVAC system having one or more components controlled at least in part by an HVAC controller, the HVAC controller having a memory and a controller, the method comprising:
providing one or more control signals from the HVAC controller to activate the HVAC system;
monitoring by the controller one or more signals from the HVAC system that are related to a delta T parameter value of the HVAC system, wherein the delta T parameter value represents a difference in air temperature between a return air side and a discharge air side of the HVAC system;
determining, by the controller, the delta T parameter value;
monitoring, by the controller, a rate of change of the delta T parameter value;
determining by the controller when the delta T parameter value becomes stable, indicating a stabilized delta T parameter value; and
recording by the controller the stabilized delta T parameter value in the memory of the HVAC controller.

18. The method of claim 17, wherein the delta T parameter value becomes stable when the delta T parameter value changes by less than a predetermined amount over a predetermined amount of time.

19. The method of claim 18, further comprising:
determining by the controller a time that elapses before the delta T parameter value becomes stable; and
recording by the controller the elapsed time in the memory.

20. The method of claim 18, further comprising:
repeating the providing, monitoring, determining, monitoring, determining and recording steps for each of a plurality of equipment stage combination of the HVAC system.

* * * * *